United States Patent
Mueck et al.

(10) Patent No.: US 11,006,280 B2
(45) Date of Patent: May 11, 2021

(54) EVOLVED NODE-B, SPECTRUM ACCESS SYSTEM (SAS) CONTROLLER AND METHOD FOR COMMUNICATION IN SHARED SPECTRUM

(71) Applicant: Apple Inc., Cupertino, CA (US)

(72) Inventors: Markus Dominik Mueck, Unterhaching (DE); Srikathyayani Srikanteswara, Portland, OR (US); David M. Horne, Chandler, AZ (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/529,403

(22) Filed: Aug. 1, 2019

(65) Prior Publication Data
US 2020/0029222 A1    Jan. 23, 2020

Related U.S. Application Data

(63) Continuation of application No. 15/569,695, filed as application No. PCT/US2015/065963 on Dec. 16, 2015, now Pat. No. 10,412,592.
(Continued)

(51) Int. Cl.
*H04W 16/14* (2009.01)
*H04W 24/08* (2009.01)
(Continued)

(52) U.S. Cl.
CPC ............ *H04W 16/14* (2013.01); *H04B 1/715* (2013.01); *H04B 1/7136* (2013.01);
(Continued)

(58) Field of Classification Search
CPC ..... H04W 16/14; H04W 24/08; H04W 24/10; H04B 1/715; H04B 1/7136
(Continued)

(56) References Cited

U.S. PATENT DOCUMENTS 9,357,395 B1    5/2016 Caulfield
9,665,303 B1    5/2017 Huff et al.
(Continued)

FOREIGN PATENT DOCUMENTS

CN           107646200 A     1/2018
WO    WO-2008081309 A2     7/2008
(Continued)

OTHER PUBLICATIONS

U.S. Appl. No. 15/569,695 U.S. Pat. No. 10,412,592, filed Oct. 26, 2017, Evolved Node-B, Spectrum Access System (SAS) Controller and Method for Communication in Shared Spectrum.
(Continued)

*Primary Examiner* — Faisal Choudhury
(74) *Attorney, Agent, or Firm* — Kowert, Hood, Munyon, Rankin & Goetzel, P.C.

(57) ABSTRACT

Embodiments of an Evolved Node-B (eNB), Private Spectrum Access System (SAS) controller, and methods for communication in shared spectrum are generally described herein. In some cases, primary usage of the shared spectrum by incumbent devices may be prioritized over secondary usage of the shared spectrum. The eNB may receive, from the Private SAS controller, a configuration message that allocates, to the eNB, a first channel included in the shared spectrum for secondary usage by the eNB. The eNB may further receive, from the Private SAS controller, a request that the eNB determine an interference measurement and may send the interference measurement to the Private SAS controller. The measurement may be based on an output transmit power used for transmission by the eNB in the shared spectrum.

20 Claims, 15 Drawing Sheets

Related U.S. Application Data

(60) Provisional application No. 62/168,467, filed on May 29, 2015.

(51) Int. Cl.
*H04B 1/7136* (2011.01)
*H04B 1/715* (2011.01)
*H04W 24/10* (2009.01)
*H04W 24/02* (2009.01)

(52) U.S. Cl.
CPC ............ *H04W 24/08* (2013.01); *H04W 24/02* (2013.01); *H04W 24/10* (2013.01)

(58) Field of Classification Search
USPC ........................................................ 370/329
See application file for complete search history.

(56) References Cited

U.S. PATENT DOCUMENTS

| | | | |
|---|---|---|---|
| 10,412,592 | B2 | 9/2019 | Mueck et al. |
| 2008/0159208 | A1 | 7/2008 | Kloker et al. |
| 2014/0237547 | A1 | 8/2014 | Bose |
| 2014/0274104 | A1 | 9/2014 | Amanna, III et al. |
| 2015/0126207 | A1 | 5/2015 | Li et al. |
| 2015/0373554 | A1* | 12/2015 | Freda .................... H04L 5/0073 455/450 |
| 2016/0183097 | A1* | 6/2016 | Richards ............ H04L 27/0006 455/454 |
| 2016/0309509 | A1* | 10/2016 | Yan ........................ H04W 16/04 |
| 2016/0330743 | A1 | 11/2016 | Das et al. |
| 2017/0374618 | A1* | 12/2017 | Ramjee ................... H04W 8/22 |
| 2018/0115903 | A1* | 4/2018 | Badic .................... H04W 16/02 |
| 2018/0132111 | A1 | 5/2018 | Mueck et al. |

FOREIGN PATENT DOCUMENTS

| | | |
|---|---|---|
| WO | WO-2014117135 A2 | 7/2014 |
| WO | WO-2014124131 A2 | 8/2014 |
| WO | 20140180507 A1 | 11/2014 |
| WO | WO-2014180507 A1 | 11/2014 |
| WO | WO-2016195751 A1 | 12/2016 |

OTHER PUBLICATIONS

"U.S. Appl. No. 15/569,695, Non Final Office Action dated Jan. 28, 2019", 14 pgs.
"U.S. Appl. No. 15/569,695, Notice of Allowance dated Apr. 25, 2019", 7 pgs.
"U.S. Appl. No. 15/569,695, Response filed Apr. 1, 2019 to Non Final Office Action dated Jan. 28, 2019", 10 pgs.
"European Application Serial No. 15894502.2, Communication Pursuant to Rule 164(1) EPC mailed Oct. 10, 2018", 17 pgs.
"European Application Serial No. 15894502.2, Extended European Search Report dated Jan. 22, 2019", 15 pgs.
"International Application Serial No. PCT/US2015/065963, International Preliminary Report on Patentability dated Dec. 14, 2017", 10 pgs.
"International Application Serial No. PCT/US2015/065963, International Search Report dated Mar. 31, 2016", 4 pgs.
"International Application Serial No. PCT/US2015/065963, Written Opinion dated Mar. 31, 2016", 8 pgs.

* cited by examiner

EVOLVED NODE-B, SPECTRUM ACCESS SYSTEM (SAS) CONTROLLER AND METHOD FOR COMMUNICATION IN SHARED SPECTRUM

PRIORITY CLAIM

This application is a continuation of U.S. patent application Ser. No. 15/569,695, filed Oct. 26, 2017, which is a U.S. National Stage Filing under 35 U.S.C. 371 from International Application No. PCT/US2015/065963, filed Dec. 16, 2015 and published in English as WO 2016/195751 on Dec. 8, 2016, which claims priority to U.S. Provisional Patent Application Ser. No. 62/168,467, filed May 29, 2015, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 3GPP LTE-Advanced Pro networks, although the scope of the embodiments is not limited in this respect. Some embodiments relate to primary and secondary usage of spectrum, such as shared spectrum. Some embodiments relate to spectrum access policies for shared spectrum. Some embodiments relate to Shared Access System (SAS) controllers and systems.

BACKGROUND

A wireless network may support communication with mobile devices for services such as voice, data and others. In some cases, throughput or capacity demands for such services may provide challenges for the network. As an example, a large number of mobile devices may be connected to the network. As another example, high data rates may be desired by some of the mobile devices connected to the network. In some cases, a limited amount of available spectrum may be available, and the network may be unable to support the mobile devices in that spectrum. Accordingly, there is a general need for methods and systems of enabling communication for the mobile devices in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
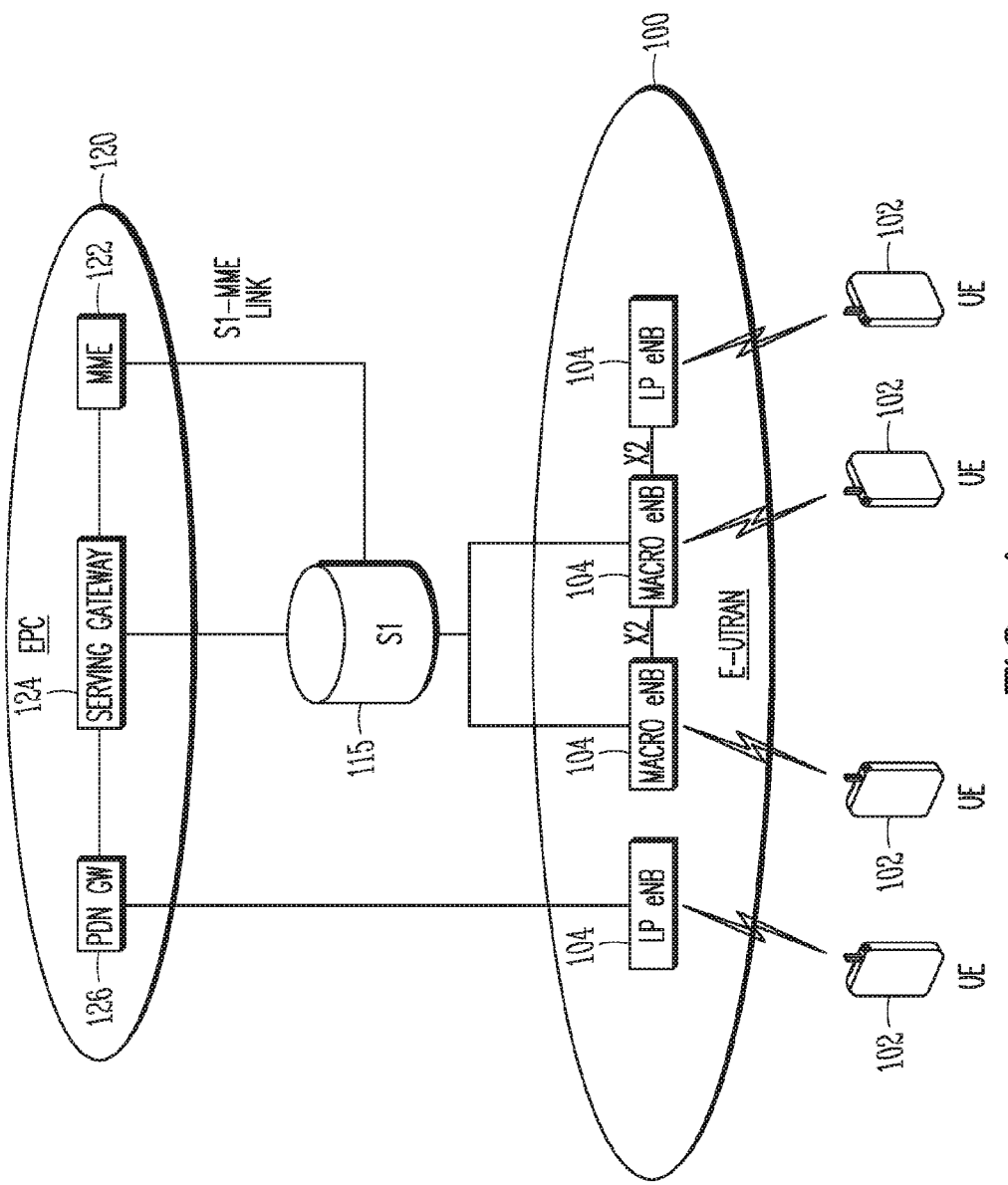
FIG. 1 is a functional diagram of a 3GPP network in accordance with some embodiments.

FIG. 1 is a functional diagram of a 3GPP network in accordance with some embodiments. It should be noted that embodiments are not limited to the example 3GPP network shown in FIG. 1, as other networks may be used in some embodiments. As an example, a Fifth Generation (5G) network may be used in some cases. Such networks may or may not include some or all of the components shown in FIG. 1, and may include additional components and/or alternative components in some cases.

The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit data messages to the UE 102 and may receive data messages from the UE 102. The data messages may be exchanged in shared spectrum, in some embodiments. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (which may be macro, micro, small-cell or any other Access Point type) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
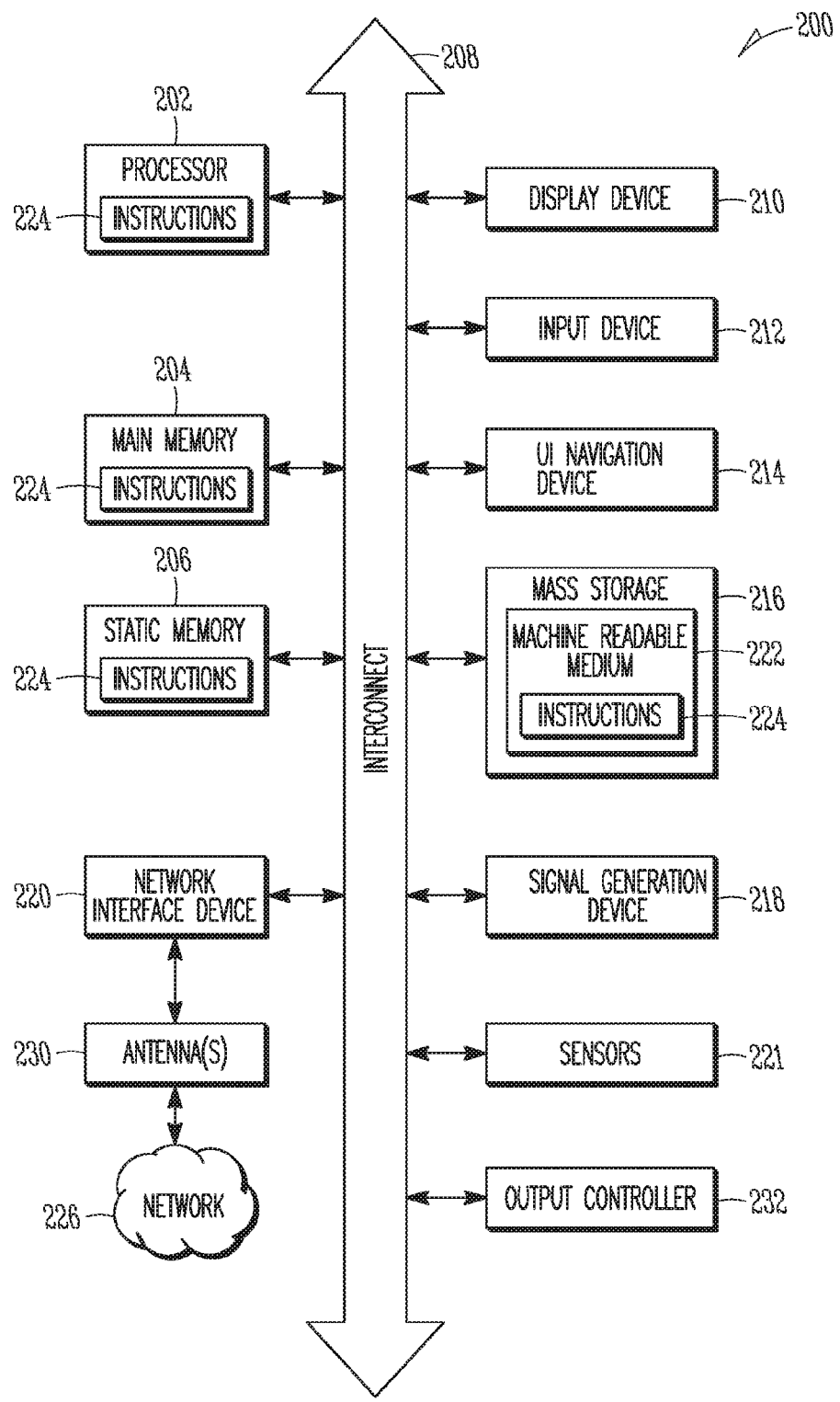
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, access point (AP), station (STA), mobile device, base station, personal computer (PC), a tablet PC, a set-top box (STB), a personal digital assistant (PDA), a mobile telephone, a smart phone, a web appliance, a network router, switch or bridge, a controller and/or controller device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
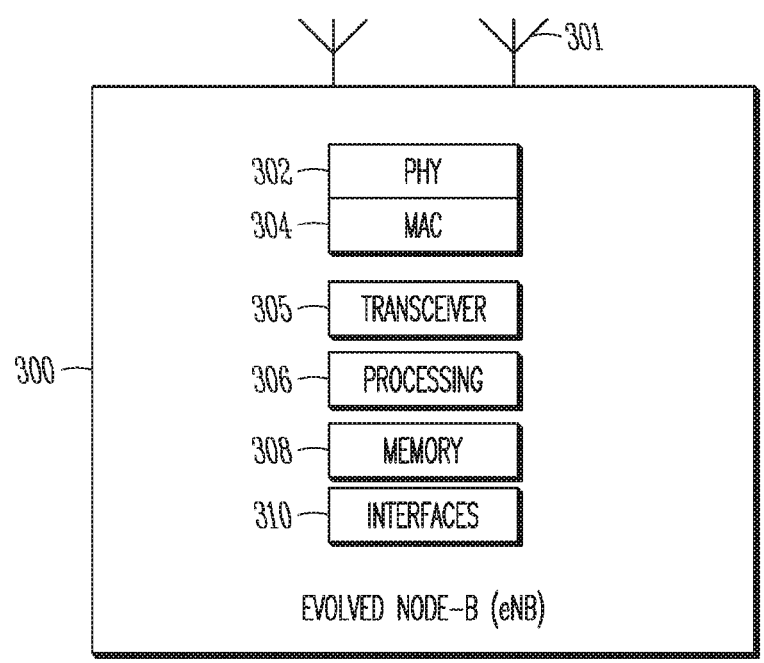
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 102, other eNBs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 or both.

The antennas 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301 may be effectively separated to take advantage of spatial diversity and the different channel characteristics that may result.

In some embodiments, the eNB 300 and/or the UE 102 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 102, eNB 300 or other device may include one or more of a keyboard, a display, a non-volatile memory port, multiple antennas, a graphics processor, an application processor, speakers, and other mobile device elements. The display may be an LCD screen including a touch screen.

Although the eNB 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the eNB 300 may include various components of the eNB 300 as shown in FIG. 3. Accordingly, techniques and operations described herein that refer to the eNB 300 (or 104) may be applicable to an apparatus for an eNB.

In accordance with some embodiments, primary usage of shared spectrum by incumbent devices may be prioritized over secondary usage of the shared spectrum. The eNB 104 may receive, from a Private SAS controller, a configuration message that allocates, to the eNB 104, a first channel included in the shared spectrum for secondary usage by the eNB 104. The eNB 104 may further receive, from the Private SAS controller, a request that the eNB 104 determine an interference measurement and may send the interference measurement to the Private SAS controller. The measurement may be based on an output transmit power used for transmission by the eNB 104 in the shared spectrum. These embodiments will be described in more detail below.

Figure 4:
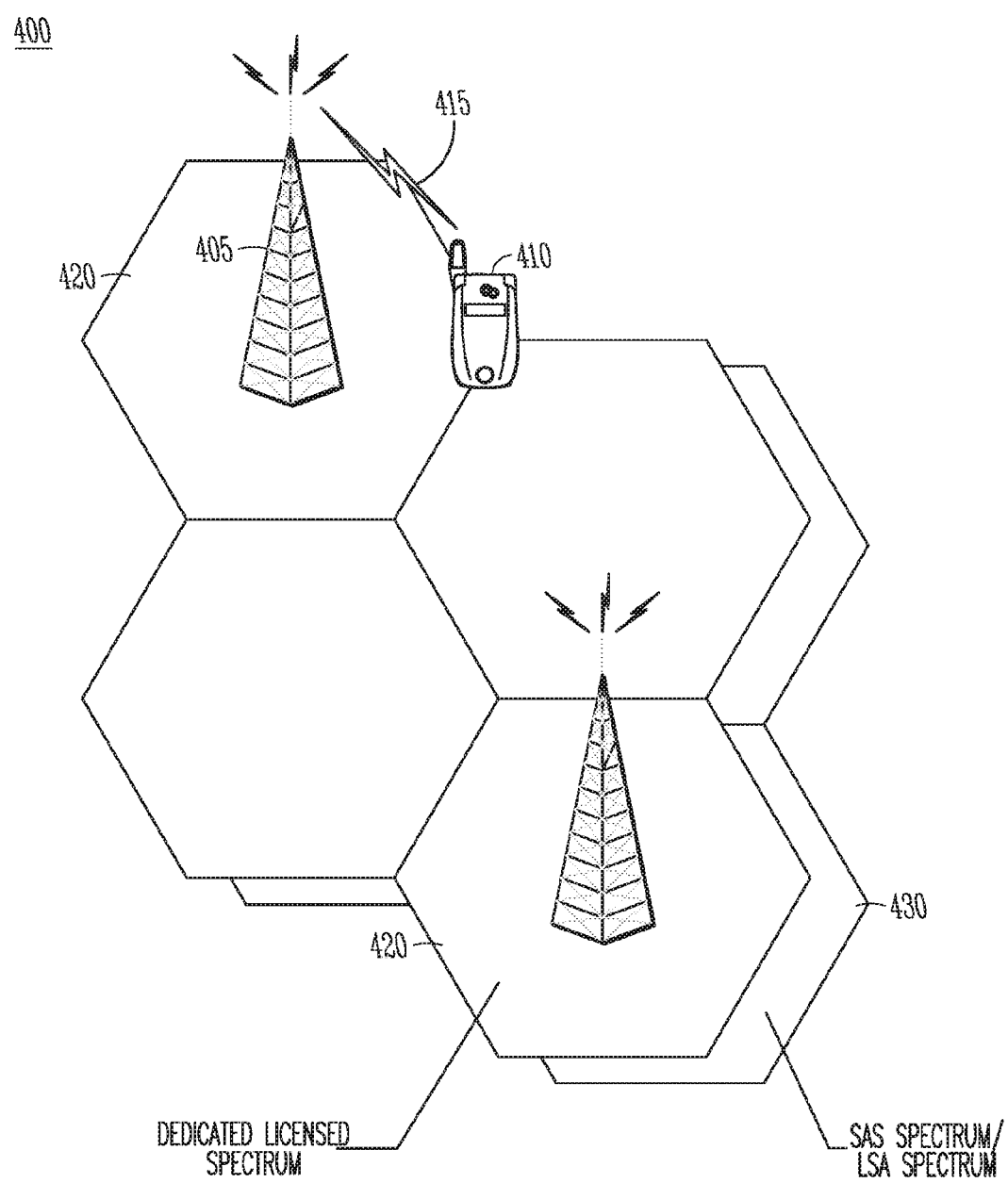
FIG. 4 illustrates an example of spectrum sharing in accordance with some embodiments.

FIG. 4 illustrates an example of spectrum sharing in accordance with some embodiments. In some embodiments, shared spectrum may be used by and/or allocated to different devices based on a usage priority. In some cases, incumbent devices and/or systems, which may be referred to as "tier-1" or other, may use the shared spectrum with a highest priority. Examples of incumbent devices and/or systems include radar, military, government and/or other devices and/or systems, although embodiments are not limited to these examples. In some cases, other devices and/or systems, which may be referred to as "tier-2" or "tier-3" or other, may use the shared spectrum in accordance with the usage priority. For instance, when incumbent devices are not using the shared spectrum, one or more base stations may use the shared spectrum for wireless communication with one or more mobile devices in compliance with applicable policies for usage of the shared spectrum. Accordingly, such tier-2 and/or tier-3 devices may include base stations, mobile devices and/or other devices in some cases.

In some embodiments, Spectrum Access System (SAS) spectrum sharing techniques may be used, although embodiments are not limited to the use of SAS for spectrum sharing. In some embodiments, Licensed Shared Access (LSA) spectrum sharing techniques may be used, although embodiments are not limited to the use of LSA for spectrum sharing. It should be noted that embodiments are not limited to the number of eNBs 405, UEs 410, cells or other elements shown in FIG. 4. Embodiments are also not limited to the arrangement shown in FIG. 4. In addition, embodiments are not limited to the usage of eNBs 405 and UEs 410 (which may be arranged to operate according to a 3GPP LTE protocol). For instance, APs, STAs, other base station components and/or other mobile devices may be used in some embodiments.

In the spectrum sharing scenario 400, the eNB 405 may communicate with a UE 410 over the wireless link 415. As shown in FIG. 4, the top layer of cells 420 may indicate communication (between the eNB 405 and the UE 410, for instance) in dedicated licensed spectrum. The bottom layer of cells 430 may indicate communication in shared spectrum, which may be LSA spectrum in this example.

In an example of spectrum sharing using LSA techniques, a 3GPP LTE network may be operated on licensed shared basis in the 2.3-2.4 GHz frequency band which corresponds to 3GPP LTE Band 40. An incumbent (tier-1) user (or base station) may be prioritized over the licensee (tier-2) user (or base station). For instance, a mobile network operator (MNO) may be required to vacate the LSA band for a given geographic area, a given frequency range and a given period of time for which the incumbent is requiring access to the resource. In some cases, the LSA band may be combined with LTE operation in dedicated licensed spectrum through suitable Carrier Aggregation mechanisms. For instance, some legacy LTE systems may be based on FDD technology, and the 3GPP Release-12 FDD/TDD Carrier Aggregation feature may be required for a suitable combination of existing deployment with LTE LSA modes. It should be noted that the LSA system approach may also be applied to any other suitable frequency band and/or any other countries/regions. For instance, usage of a 2.7 GHz band may be a potential candidate in Japan. In other frequency bands, the spectrum sharing may be slightly modified in order to accommodate for specific requirements, such as propagation characteristics of the target frequency band, specifics (such as configuration, behavior, etc.) of the incumbent system. Typical modifications may include different signal bandwidths (instead of 10 MHz bands for SAS for example), short-time hand-over into target shared bands and out of them (due to short term spectrum availability due to behavior of incumbent user).

In an example of spectrum sharing using Spectrum Access System (SAS) techniques, a 3GPP LTE network may be operated on licensed shared basis in the 3.55-3.7 GHz frequency band which corresponds to 3GPP LTE Bands 42 and 43. In some cases, SAS may differ from LSA in that licensed spectrum slots may be only available in parts of the entire SAS band (up to 70 MHz) for so-called Primary Access License (PAL or PA) tier-2 users. The remaining part of the spectrum, as well as unused portions of the PAL spectrum ("use-it-or-share-it" rule), may be available to a new user class called General Authorized Access (GAA) tier-3 users. This tier-3 class may not exist in the LSA system definition. GAA users may typically operate LTE Licensed Assisted Access (LSA) or WiFi type systems, and may make modifications in order to be adapted to SAS requirements. For instance, such requirements may be imposed by a governing body, such as the Federal Communication Commission (FCC) or other, in some cases. It should be noted that the SAS system approach may also be applied to any other suitable frequency band and/or any other countries/regions. For instance, usage of a 2.7 GHz band may be a potential candidate in Japan. In other frequency bands, the spectrum sharing may be slightly modified in order to accommodate for specific requirements, such as propagation characteristics of the target frequency band, specifics (such as configuration, behavior, etc.) of the incumbent system. Typical modifications may include different signal bandwidths (instead of 10 MHz bands for SAS for example), short-time hand-over into target shared bands and out of them (due to short term spectrum availability due to behavior of incumbent user).

It should be noted that both systems, LSA and SAS, may be defined for usage in a specific frequency band. The basic operational principles of those systems, however, may be frequency agnostic in some cases, and may be straightforwardly applied to other bands. For instance, techniques may be applied to 3.5 GHz candidate bands in some cases.

Figure 5:
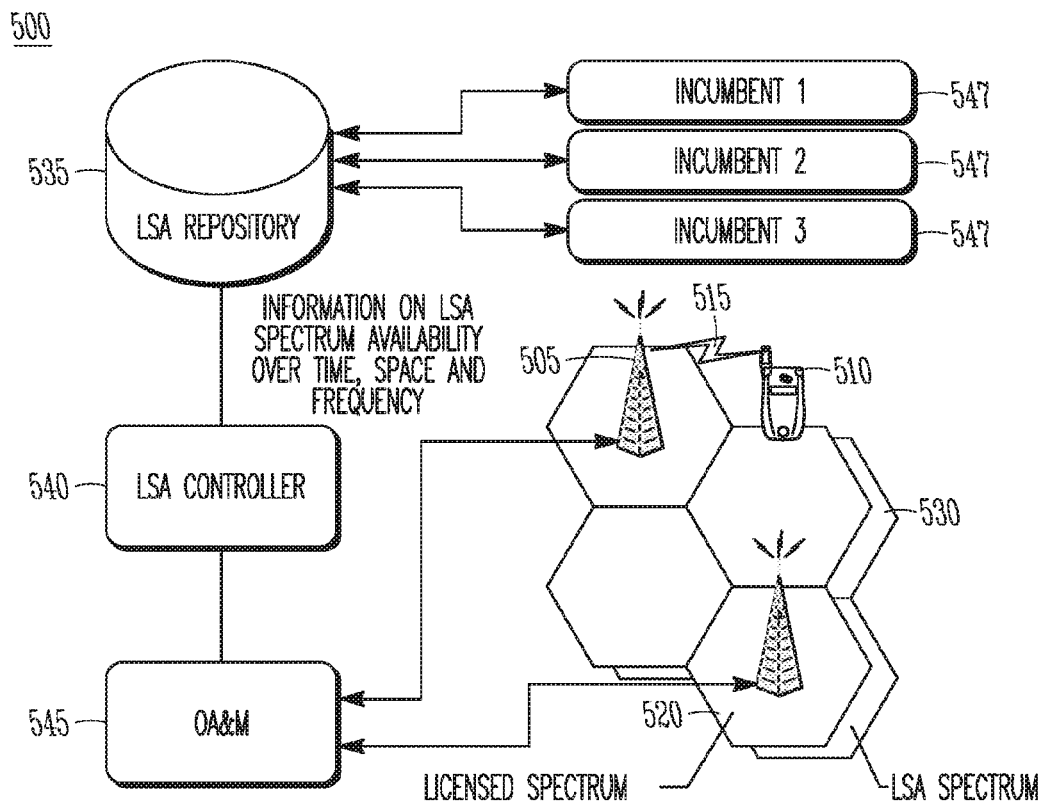
FIG. 5 illustrates an example network for a Licensed Shared Access (LSA) arrangement and an example network for a Spectrum Access System (SAS) arrangement in accordance with some embodiments.
Figure 5:
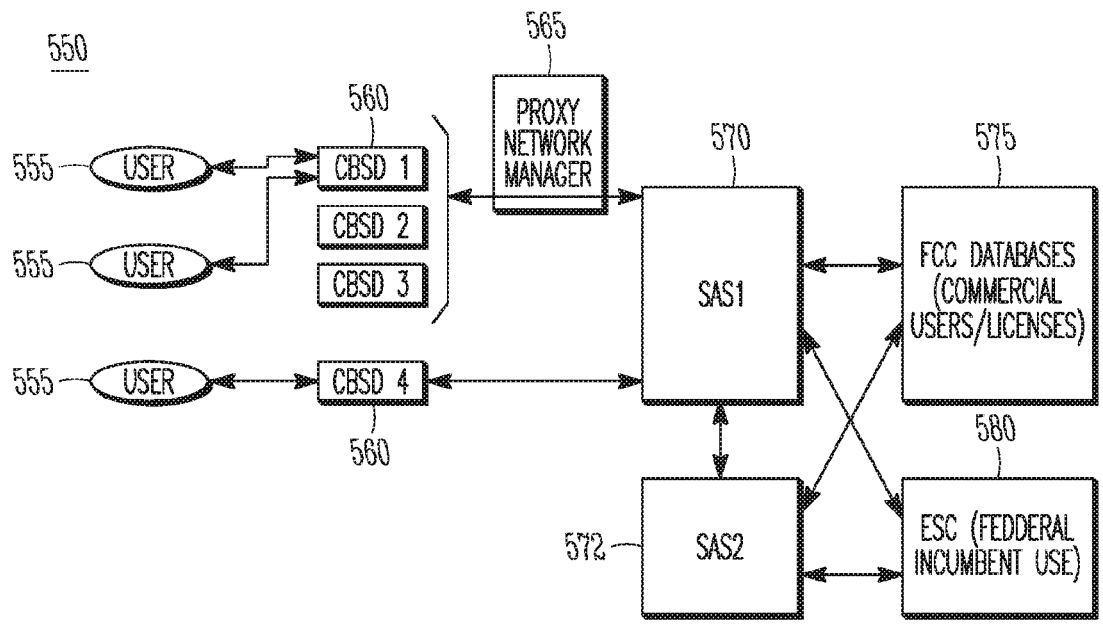

FIG. 5 illustrates an example network for a Licensed Shared Access (LSA) arrangement and an example network for a Spectrum Access System (SAS) arrangement in accordance with some embodiments. It should be noted that embodiments are not limited to the number of eNBs 505, UEs 510, base stations, mobile devices, cells or other elements shown in FIG. 5. Embodiments are also not limited to the type of components shown in FIG. 5 and/or arrangements of the components as shown in FIG. 5. In addition, embodiments are not limited to the usage of eNBs 505 and UEs 510 (which may be arranged to operate according to a 3GPP LTE protocol). For instance, APs, STAs, other base station components and/or other mobile devices may be used in some embodiments.

In the spectrum sharing scenario 500, LSA techniques may be used. The eNB 505 may communicate with a UE 510 over the wireless link 515. As shown in FIG. 5, the top layer of cells 520 may indicate communication (between the eNB 505 and the UE 510, for instance) in dedicated licensed spectrum. The bottom layer of cells 530 may indicate communication in shared spectrum, which may be LSA spectrum in the example scenario 500.

The LSA Repository 535 may be a centralized database that may be used for spectrum management in this scenario 500. The incumbent users 547 may be required to provide a-priori usage information to the LSA repository 535 (or database) on the availability of LSA spectrum over space and time. Depending on this information, the LTE system may be granted access or may be requested to vacate one or more frequency bands through control mechanisms and/or operations that may be performed (at least partly) by the LSA Controller 540. In this operational approach, sensing mechanisms may not necessarily be required to support the system for the identification of incumbent operation.

In the spectrum sharing scenario 550, SAS techniques may be used. Embodiments are not limited to the number, arrangement and/or type of base stations used. As an example, one or more Citizens Broadband Service Devices (CBSD) 560 may be used. A CBSD may be or may include a base station component that operates in shared spectrum according to rules defined and/or enforced by a governing body (such as the FCC) or other entity. As another example, one or more eNBs may be used. Embodiments are not limited to the number, arrangement and/or type of mobile devices that may communicate with the CBSDs 560 (or other base station component) in the shared spectrum and/or other spectrum. As an example, any number of users 555 may be used, in which a user may be a mobile device and/or stationary device, such as a UE, STA or other.

In some embodiments, SAS may be designed to ensure coexistence with incumbent users who may not be able to provide any a-priori information to a central database. In some cases, such design considerations may differ in comparison to LSA. In some cases, an Environmental Sensing Capability (ESC) 580 component may perform sensing tasks. As a non-limiting example, the ESC 580 may be included for military applications. In some cases, spectrum access decisions for tier-3 and tier-2 users may be based at least partly on such sensing results. As non-limiting example, unlicensed systems such as Wi-Fi (802.11) or Bluetooth, may be tier-3 users.

As an example, the FCC and/or other entity may mandate and/or advise that a spectrum sharing technique, such as SAS, be used to coordinate usage of shared spectrum between incumbent devices, PA devices and/or GAA devices. Accordingly, it may be mandatory that tier-2 and tier-3 devices communicate with the SAS constantly or at least continuously while operating in the shared spectrum in order to ensure compliance by the tier-2 and/or tier-3 devices.

It should be noted that embodiments and/or exemplary scenarios described herein may involve devices (including PAL user devices for SAS, GAA user devices for SAS, LSA Licensee user devices for LSA, incumbent users for any systems, other mobile devices, and/or other devices) operating and/or arranged to operate according to 3GPP (Third Generation Partnership Project) specifications, such as Long Term Evolution (LTE) and Long Term Evolution-Advanced (LTE-A) and LTE-Advanced Pro. However, it is understood that such embodiments and/or exemplary scenarios may be similarly applied to other mobile communication technologies and standards, such as any Cellular Wide Area radio communication technology, which may include e.g. a 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), 3GPP LTE-Advanced Pro, CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 14), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), ETSI OneM2M, IoT (Internet of things), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin or "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay and/or others) and/or others. The embodiments and/or examples provided herein are thus understood as being applicable to various other mobile communication technologies, both existing and not yet formulated.

In some cases, such devices may be arranged to support wireless and/or wired communication that may or may not necessarily be defined by a standard, in addition to or instead of the mobile communication technologies and/or standards described above.

As an example, spectrum sharing may be performed and/or implemented in the 2.3-2.4 GHz band. As another example, spectrum sharing may be performed and/or implemented in the 3.55-3.7 GHz band (US). As another example, some or all of the techniques described herein may be applicable to other frequency bands. For instance, broadband wireless communication bands below 6 GHz or mmWave bands from 6 GHz to 100 GHz may be used in some cases. In some embodiments, additional techniques may be used for spectrum sharing. For instance, techniques for accommodation of fast adaptation requirements by the incumbents may be used.

Figure 6:
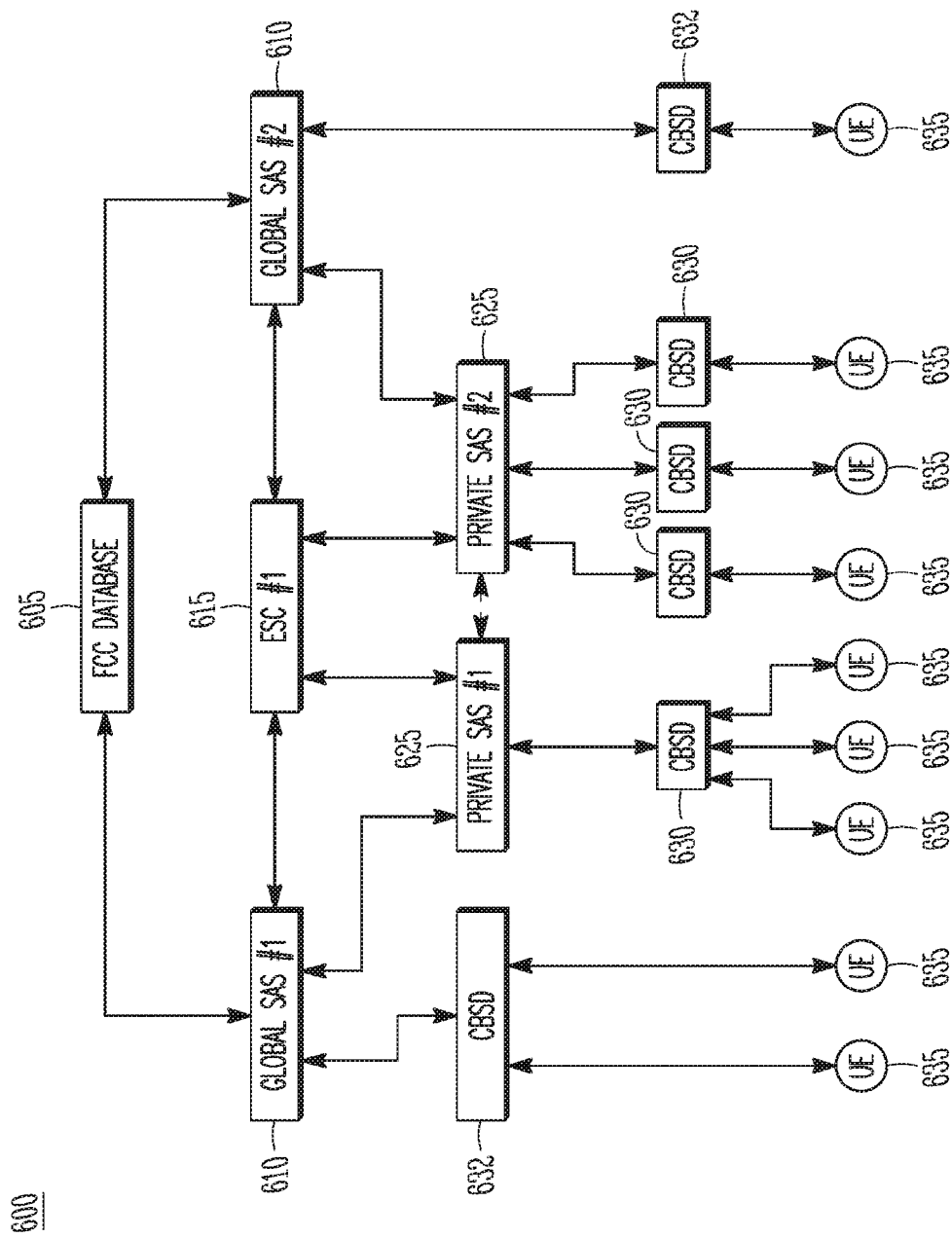
FIG. 6 illustrates an example network architecture that includes a SAS hierarchy in accordance with some embodiments.
Figure 7:
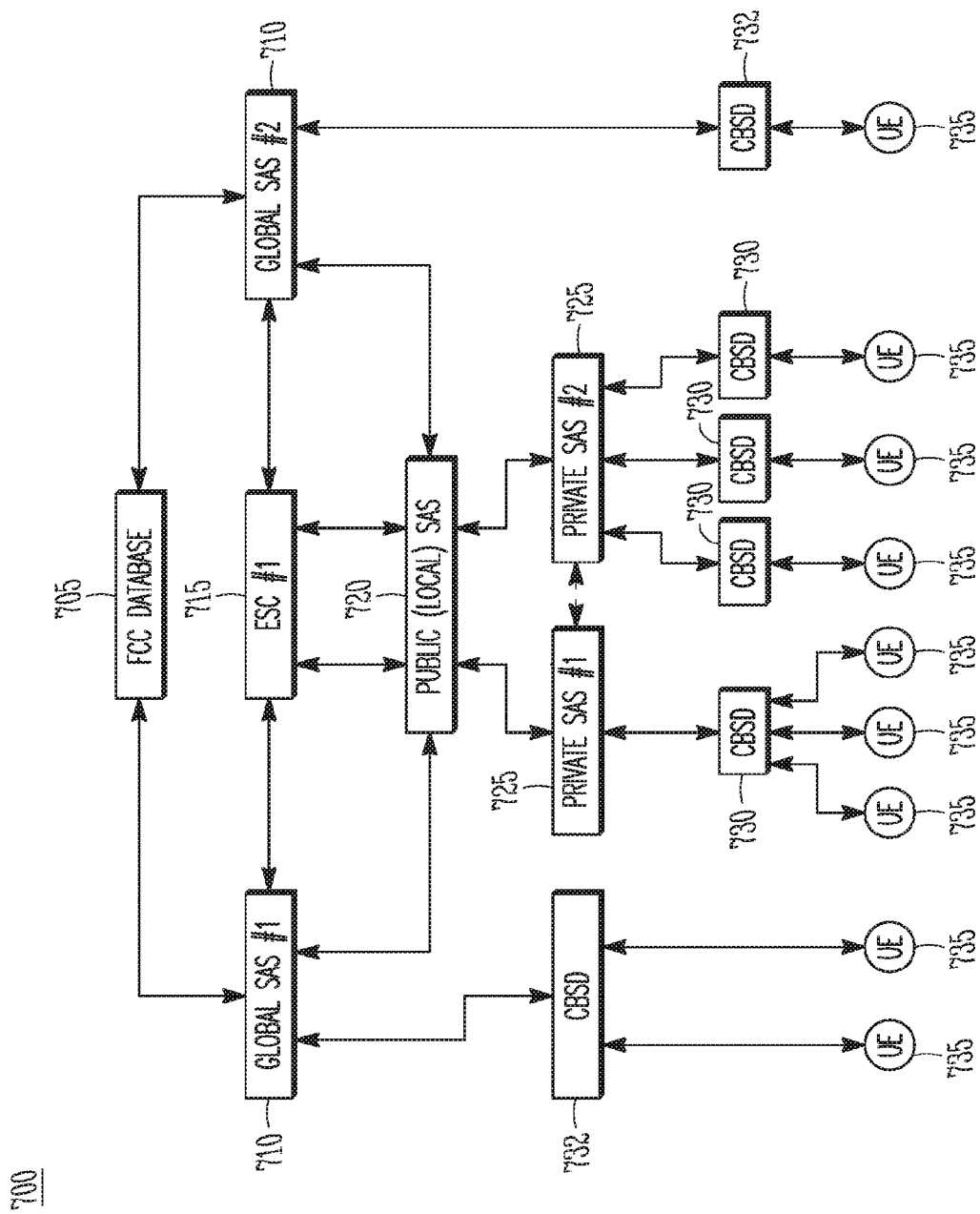
FIG. 7 illustrates another example network architecture that includes a SAS hierarchy in accordance with some embodiments.

FIG. 6 illustrates an example network architecture that includes a SAS hierarchy in accordance with some embodiments. FIG. 7 illustrates another example network architecture that includes a SAS hierarchy in accordance with some embodiments. In some embodiments, these and other networks may be used for allocation of shared frequency spectrum for secondary usage. In some cases, the spectrum may be used by an incumbent device for primary usage and/or priority usage. Such spectrum may be used infrequently or for a limited time period in some cases. As an example, a television channel may be off the air during an overnight time period. As another example, radar signals may be transmitted in dedicated spectrum at an infrequent rate.

It should be noted that embodiments are not limited to the number, type and/or arrangement of components shown in the example networks 700, 800. As an example, embodiments are not limited to the usage of eNBs 630, 730 and/or UEs 635, 735 (which may be arranged to operate according to a 3GPP LTE protocol). For instance, CBSDs, APs and/or other base station components may be used in some embodiments. In addition, STAs and/or other mobile devices may be used in some embodiments. It should also be noted that references may be made to CBSDs 630, 730 in describing embodiments related to the example networks 600, 700, other networks and/or other embodiments. Such references are not limiting, however, as eNBs 630 and/or other base station components may be used in some embodiments.

In some embodiments, one or more of the CBSDs 630, 730 may be configured as eNBs 104 configured to operate in the 3GPP network as shown in FIG. 1 and may also be configured to operate as part of a network such as 600, 700 and/or other for spectrum sharing. Accordingly, such an eNB 104 may communicate with the MME 122, serving GW 124, and PDN GW 126 as part of the operation of the 3GPP network, and may also communicate with components included in networks such as 600, 700 and/or others as part of the spectrum sharing operation. Communication, by the eNB 104, with components in the two networks (3GPP and SAS) may or may not be independent and/or related.

As shown in FIG. 6, one or more Global SAS controllers 610 and one or more Private SAS controllers 625 may operate as part of a SAS hierarchy to perform management, allocation, monitoring and/or other operations related to the shared spectrum. The shared spectrum may be allocated to various CBSDs 630 for secondary usage for communication with UEs 635. In some cases, additional components and/or other components may be used as part of a SAS hierarchy. As shown in the example network 700 in FIG. 7, one or more Global SAS controllers 710, one or more Public (local) SAS controllers 720, and one or more Private SAS controllers 725 may operate as part of a SAS hierarchy to perform management, allocation, monitoring and/or other operations related to the shared spectrum. The shared spectrum may be allocated to one or more CBSDs 730 for secondary usage for communication with UEs 735.

It should be noted that in some embodiments, one or more CBSDs may be directly accessible and/or managed by a global SAS controller or a Public SAS controller. As an example, one or more CBSDs 632, 732 may be directly accessible to global SAS controllers 610, 710 as shown in FIGS. 6-7.

Various operations and/or techniques presented below and elsewhere herein may refer to the Public SAS controller 720, Private SAS controller 725, CBSDs 730, and UEs 735 shown in FIG. 7, but it is understood that such operations and/or techniques are not limited to the example of FIG. 7, and may be applicable to other embodiments in some cases.

In some embodiments, the Public SAS controller 720 may register and/or unregister (directly accessible) CBSDs 730, the Private SAS controller 725 and/or bundles of CBSDs 730 being communicated with as a group through a Private SAS controller 725. The Public SAS controller 720 may allocate channels for use by (directly accessible) CBSDs 730 and/or Private SAS controllers 725 and bundles of CBSDs 730 being communicated as a group through a Private SAS controller 725. The Public SAS controller 720 may set power levels for the CBSDs 730 (and/or connected UEs 735 or end user devices) directly connected to it and may provide aggregate interference levels for Private SAS controllers 725. Power levels may relate to per-device levels or aggregate levels (i.e. sum of output power levels) being created by a group of CBSDs 730 (and/or connected UEs 735 or end users). The Public SAS controller 720 may receive spectrum quality information (from sensing) and other radio environment maps from a single or multiple ESCs 715. The Public SAS controller 725 may receive license information, rules triggers, (configuration) requirements, etc. from a single or multiple FCC databases (such as 605 or 705 in FIGS. 6-7). The Public SAS controller 720 may resolve interference problems in a given area by contacting the CBSDs directly registered to it as well as the Private SAS controllers 725. The Public SAS controller 720 may protect higher tiers from interference from lower tiers. As an example, if the Public SAS controller 720 notes that noise floor or interference metrics are too high in a given area, it may contact all the CBSDs 730 and/or Private SAS controllers 725 that claim to be operating in that area. For instance, the interference metrics may exceed an interference level allowance and/or other interference threshold. As another example, if the device is a CBSD 730, it may adjust its output power level. As another example, if the Private SAS controller 725 has jurisdiction over that area, it may lower the aggregate interference numbers for the Private SAS controller 725 for the given region. For instance, an interference level allowance for the region may be lowered. As another example, the SAS controllers could potentially subdivide a census tract into smaller regions for interference management.

The Public SAS controller 720 may exchange information with other Global SAS controllers and/or Private SAS controllers 725. As an example, based on the geographic area in which the Private SAS controller 725 is operating in, the Public SAS controller 720 may share all the information that it has about the devices and other Private SAS controllers 725 operating in that region. It may provide other Public SAS controllers 720 with some or all of its information pertaining to the region the Public SAS controller 720 operates in. The Public SAS controller 720 may manage triggers, requirements, requests, etc. from the incumbent.

For example, the incumbent may change protection and/or interference requirement levels (such as an interference level allowance and/or other) for given geographic areas. The incumbent may also require that tier-2 and/or tier-3 users vacate the band (or parts of the band, which may concern only selected PAL/GAA slots). The Public SAS controller 720 may manage system reconfiguration, for example for allocation of new PAL spectrum slots and/or GAA spectrum slots. For instance, the Public SAS controller 720 may re-allocate the slots, increase or decrease the number of slots and/or perform other operations.

The Public SAS controller 720 may mange sub-division of PAL/GAA spectrum slots. That is, parts of PAL/GAA spectrum slots may be allocated to or occupied by distinct stakeholders, users, MNOs and/or others entities. The Public SAS controller 720 may manage grouping of PAL/GAA spectrum slots. For example, spectrum aggregation may be employed in order to use a larger band configuration of target systems (such as 20 MHz LTE). The Public SAS controller 720 may manage guard bands between neighboring systems, for instance some PAL and/or GAA slots may be allocated to act (at least partly) as guard band(s) between neighboring systems (at the lower/upper edge) of the concerned spectrum slot. The Public SAS controller 720 may re-allocate PAL and/or GAA slots dynamically such that interference between neighboring systems is minimized. The Public SAS controller 720 may group PAL and/or GAA users to compete within a given group for access to a given spectrum slot. For instance, there may be groups of GAA users and only members of a given group may compete against each other for accessing a spectrum slot. The Public SAS controller 720 may group PAL and/or GAA users of a given aggregate BW, for instance, users accessing a 10 MHz bandwidth may be group together, users accessing a 20 MHz bandwidth (for instance through carrier aggregation) are grouped together. The Public SAS controller 720 may manage (mass) distribution of (urgent) information to CBSDs 730, UEs 735 and/or end users. For instance, such information may include disaster event related information, information on medical emergencies and/or other information. The Public SAS controller 720 may exclude specific nodes (CBSDs 730, Private SAS controllers 725, UEs 735 and/or other end users) from accessing specific PAL/GAA spectrum slots. For instance, such exclusion may occur in cases in which a PAL/GAA user does not abide by applicable spectrum usage etiquette, policies and/or guidelines. The Public SAS controller 720 may manage carrier aggregation, for instance the Public SAS controller 720 may direct users (CBSDs 730, Private SAS controllers 725, UEs 735 and/or other end users) to switch to specific CA modes, for instance using specific PAL/GAA bands jointly. Alternatively, the SAS controller may direct specific CBSDs 730, Private SAS controllers 725, UEs 735 and/or other end users to stop employing CA and to use a single PAL/GAA spectrum slot only. The Public SAS controller 720 may manage allocation of time slots (TDMA) to specific users (CBSDs 730, Private SAS controllers 725, UEs 735 and/or other end users) or groups of users (CBSDs 730, Private SAS controllers 725, UEs 735 and/or other end users) such that the PAL/GAA spectrum blocks are shared over time. The Public SAS controller 720 may manage allocation of frequency slots (FDMA) to specific users (CBSDs 730, Private SAS controllers 725, UEs 735 and/or other end users) or groups of users (CBSDs 730, Private SAS controllers 725, UEs 735 and/or other end users) such that the PAL/GAA spectrum blocks are shared over frequency. The Public SAS controller 720 may manage allocation of time and frequency slots (joint TDMA/FDMA) to specific users (CBSDs 730, Private SAS controllers 725, UEs 735 and/or other end users) or groups of users (CBSDs 730, Private SAS controllers 725, UEs 735 and/or other end users) such that the PAL/GAA spectrum blocks are shared over time and frequency. The Public SAS controller 720 may manage user groups of distinct priority. For instance, gold users (CBSDs 730, Private SAS controllers 725, UEs 735 and/or other end users) may have better access to resources and/or QoS compared to silver or bronze users. The Public SAS controller 720 may manage spectrum and/or infrastructure sharing between various operators and other stakeholders. For example, there may be spectrum sharing between commercial MNOs and civil security/military stakeholders. In such a case, one or more of the SAS controllers may impose which of the stakeholders can access which part of the resources/infrastructure at which point in time and which location. In case of a disaster event, a civil security stakeholder may request that one or more SAS controllers reserve resources and infrastructure to civil security equipment and applications. The Public SAS controller 720 may manage dynamic spectrum licenses. For instance, the corresponding auctioning mechanisms may be processed in the one or more SAS controllers with different stakeholders (such as MNOs or other) competing for PAL and/or GAA spectrum resources. The Public SAS controller 720 may manage end user devices switching from one CBSD 730 to another CBSD 730, either or both of which may or may not be within a Private SAS controller 725 domain. In particular, the Public SAS controller 720 may identify the new available PAL/GAA resources and may initiate the required handoff from one CBSD 730 to another.

The Private SAS controller 725 (or Private SAS proxy) may manage operator CBSDs 730 (such as GAA and/or PAL) as well as UEs 735 within its network. The Private SAS controller 725 may register with a global SAS a) provide geographic area where it has its devices b) range of devices in its network and types of devices. The Private SAS controller 725 may register the individual CBSDs, both PAL and GAA. The Private SAS controller 725 may assign channels to individual GAA CBSD devices 730, UEs 735 within network. The Private SAS controller 725 may assign frequency/channels for the PAL CBSDs 730 to use. The Private SAS controller 725 may assign TX power levels for GAA CBSDs 730 and/or PAL CBSDs 730. The Private SAS controller 725 may request CBSDs 730 to change channels for interference mitigation, interference management and spectrum optimization. The Private SAS controller may request sensing reports from UEs 735 and/or CBSDs 730 and/or sensors, may compute aggregate interference being output from its devices to ensure compliance to global SAS policies, may request CBSDs 730 to change channels or change TX power to optimize spectrum usage, may manage interference and/or may maintain aggregate interference limits (such as an interference level allowance and/or other). The CBSDs 730 may register with a Proxy SAS controller and not with global SAS, in some cases. The Private SAS controller 725 may cease all operations in the band for the device it controls. The Private SAS controller 725 may respond to requests from the global SAS controller if interference needs to be reduced in a given region. The Private SAS controller 725 may provide aggregate interference estimates from its devices to the global SAS. The Private SAS controller 725 may optionally coordinate with other Private SAS controllers 725 for interference management and channel usage of GAA CBSDs 730.

In some embodiments, the Private SAS controller 725 may register with the Global SAS 710 with the basic information. The Public SAS controller 720 may assign a set of channels to the Private SAS. Rather than assign individual power levels to each of the CBSDs 730, the Global SAS 710 may assign an aggregate interference level (such as an interference level allowance and/or other) that the network of CBSDs 730 and UEs 735 have to maintain. The Private SAS controller 725 may use this information to assign individual power levels to each of the CBSDs 730, which in turn may manage power levels for the UEs 735 connected to them. Similarly, if the interference levels need to be adjusted, the Public SAS controller 720 may provide information to the Private SAS controller 725 for reducing the aggregate output interference. The Private SAS controller 725 may then be responsible for identifying which CBSDs 730 need to reduce power and by how much such that the aggregate metric is met.

It should be noted that the proposed approach (as described herein) for splitting the SAS into a Private SAS controller and a Public SAS controller may have the objective to keep part of the SAS functionality with the target operator's (typically PAL and/or GAA operator) network (i.e., the Private SAS) and part of the SAS functionality outside of the target operator's network. Any other functional split of the SAS controller (or any other SAS functionality) can be envisaged. Also, it is possible that multiple operators may create some multi-stakeholder (closed) (sub-) network where some information may be exchanged. The Private SAS controller may thus not be located in a single operator's network (or domain) but within the multi-stakeholder (closed) (sub-)network. It is also possible that the multi-stakeholder (closed) (sub-)network may correspond to an additional hierarchical level, leading to a total of three (or more) hierarchical levels: i) Public SAS controller, ii) multi-stakeholder (closed) (sub-)network SAS controller, iii) Private SAS controller.

In some embodiments, the Public (local) SAS controller 720 may process trigger events, may identify affected Private SAS controllers 725, and may forward related information only to the affected Private SAS controllers 725. As an example, an incumbent device may require usage of primary spectrum that represents a small fraction of the entire shared spectrum. The incumbent may incumbent may trigger the concerned SAS tier-2 (PA users) and/or tier-3 (GAA users) to vacate the concerned spectrum. The Public (local) SAS controller 720 may identify which tier-2 and/or tier-3 users actually operate in the portion of the shared spectrum that is to be vacated, and may forward the trigger to those users. In some cases, the trigger may be forwarded only to the affected users.

In some embodiments, the incumbent device may begin to use a portion of the shared spectrum, and the usage may be detected by an ESC 715, which may notify the area of channels that may need to be vacated. The Global SAS 710 may send the triggers to the Public SAS controllers 720 and/or Private SAS controllers 725 operating in the area. In some embodiments, a particular Public SAS controller 720 or Private SAS controller 725 may be in communication with both the ESC 715 and the Global SAS 710, and may therefore receive such information from both components in some cases.

In some embodiments, uplink information from a number of Private SAS controllers 725 may be bundled by the Public (local) SAS controller 720 and forwarded to the Global SAS and/or incumbent device in a manner that may be more efficient than individual communication, in some cases. As an example, such information may be collected by the Public (local) SAS controller 720 and filtered, grouped and/or sorted in a manner that groups one or more Private SAS controllers 725 together.

Figure 8:
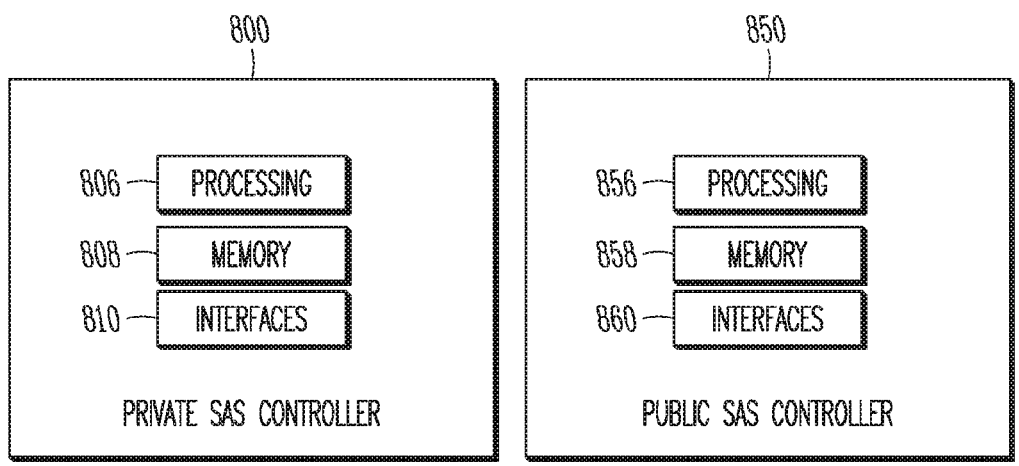
FIG. 8 illustrates example block diagrams for a Private SAS controller and a Public SAS controller in accordance with some embodiments.

FIG. 8 illustrates example block diagrams of a Private SAS controller and a Public SAS controller in accordance with some embodiments. The Private SAS controller 800 may be suitable for use as a Private SAS controller 625, 725 as depicted in FIGS. 6-7 and elsewhere herein, in some embodiments. The Public SAS controller 850 may be suitable for use as a Public SAS controller 620, 720 as depicted in FIGS. 6-7 and elsewhere herein, in some embodiments. The Private SAS controller 800 may include processing circuitry 806 and memory 808 arranged to perform the operations described herein. The Private SAS controller 800 may also include one or more interfaces 810, which may enable communication with other components, including the Public SAS controller 850, CSBDs 630, 730 and/or other components. The interfaces 810 may be wired or wireless or a combination thereof. The Public SAS controller 850 may include processing circuitry 856 and memory 858 arranged to perform the operations described herein. The Public SAS controller 850 may also include one or more interfaces 860, which may enable communication with other components, including the Private SAS controller 800, CSBDs 630, 730 and/or other components. The interfaces 860 may be wired or wireless or a combination thereof. In some embodiments, the memory 808 and/or memory 858 may include a storage element adapted to store an interference level allowance and/or other information.

It should be noted that in some embodiments, a Private SAS controller may include some or all of the components shown in either FIG. 2 or FIG. 8 or both. It should also be noted that in some embodiments, a Public SAS controller may include some or all of the components shown in either FIG. 2 or FIG. 8 or both. Although the Private SAS controller 800 and the Public SAS controller 850 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the Private SAS controller 800 may include various components of the Private SAS controller 800 as shown in FIG. 8. In some embodiments, an apparatus used by the Public SAS controller 800 may include various components of the Public SAS controller 850 as shown in FIG. 8. Accordingly, techniques and operations described herein that refer to the Private SAS controller 800 and/or Public SAS controller 850 may be applicable to an apparatus for a Private SAS controller 850 and/or Public SAS controller 850.

Figure 9:
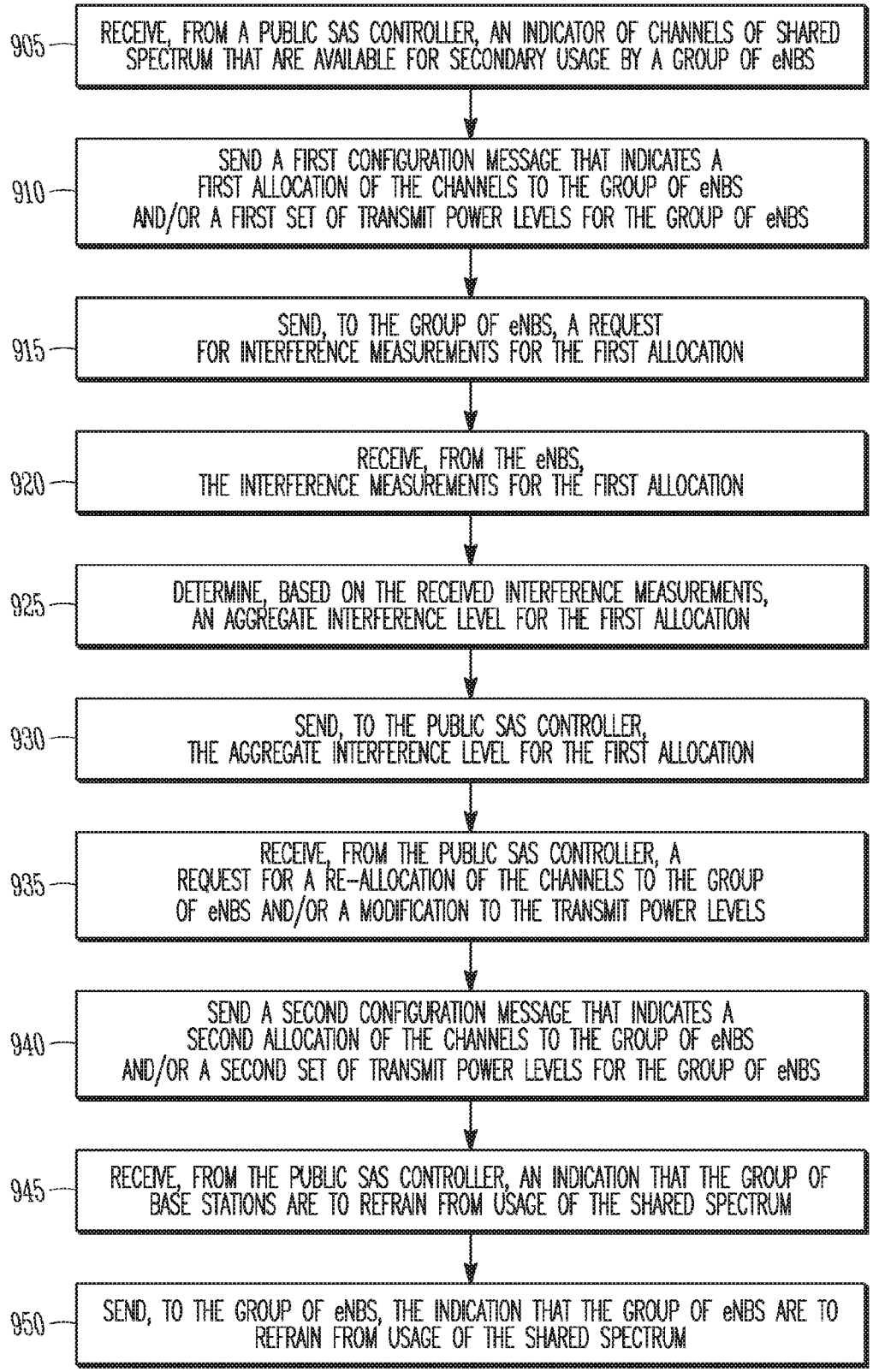
FIG. 9 illustrates the operation of a method of communication in shared spectrum in accordance with some embodiments.

FIG. 9 illustrates the operation of a method of communication using shared spectrum in accordance with some embodiments. It is important to note that embodiments of the method 900 may include additional or even fewer operations or processes in comparison to what is illustrated in FIG. 9. In addition, embodiments of the method 900 are not necessarily limited to the chronological order that is shown in FIG. 9. In describing the method 900, reference may be made to FIGS. 1-8 and 10-14, although it is understood that the method 900 may be practiced with any other suitable systems, interfaces and components.

In addition, while the method 900 and other methods described herein may refer to eNBs 104 or UEs 102 operating in accordance with 3GPP or other standards, embodiments of those methods are not limited to just those eNBs 104 or UEs 102 and may also use other devices, such as a CSBD, Wi-Fi access point (AP) or user station (STA). In addition, the method 900 and other methods described herein may be practiced by wireless devices configured to operate in other suitable types of wireless communication systems, including systems configured to operate according to various IEEE standards such as IEEE 802.11. In some embodiments, a CBSD (such as the CBSD 630, CBSD 730 or other) may be included as a base station component. It should be noted that the CBSD may be an eNB 104 and/or may be configured to operate as an eNB 104 in some cases. Accordingly, reference may be made to an eNB 730 in descriptions herein, but such reference does not limit the scope of the embodiments.

It should be noted that although operations and/or techniques may be described in terms of the Public SAS controller 720, Private SAS controller 725, eNBs 730, and UEs 735 shown in FIG. 7, it is understood that such operations and/or techniques are not limited to the example of FIG. 7, and may be applicable to other embodiments in some cases. In addition, while the method 900 and other methods described herein may refer to a Private SAS controller 725 and/or Public SAS controller 720 that may operate in an SAS network, embodiments are not limited to those devices and are also not limited to SAS networks. In some embodiments, the method 900 may be practiced by or may use other controller devices in addition to, or instead of, the Private SAS controller 800 and/or Public SAS controller 850. The method 900 may also refer to an apparatus for a UE 102, eNB 300, Private SAS controller 800, Public SAS controller 850 and/or other device described above.

At operation 905 of the method 900, the Private SAS controller 725 may receive, from the Public SAS controller 720, an indicator of channels that are available for secondary usage by a group of eNBs 730, the channels included in shared spectrum reserved for primary usage by an incumbent device. In some embodiments, the Private SAS controller 725 may also receive, from the Public SAS controller 720, information related to transmit power levels and/or interference levels that may be permitted and/or desired for the eNBs 730 (such as an interference level allowance and/or other). For instance, the eNBs 730 may be located in a geographic area, and the Public SAS controller 720 may indicate such information for the geographic area. In some cases, the Public SAS controller 720 may provide high level information and/or guidelines to the Private SAS controller 725 for this purpose. In some embodiments, the Private SAS controller 725 may receive messages from the Public SAS controller 720 that may indicate an availability (or unavailability) of the shared spectrum (or one or more channels and/or portions of the shared spectrum) for secondary usage by the eNBs 730 for communication with one or more UEs 735.

As an example, the availability of the shared spectrum for the secondary usage may be restricted to inactivity periods of one or more incumbent devices. As another example, an availability of the shared spectrum for the secondary usage may be based at least partly on an inactivity condition of the incumbent devices. As another example, an unavailability of the shared spectrum for the secondary usage may be based at least partly on an activity condition of the incumbent devices. As another example, the availability may be based at least partly on one or more scheduled periods of inactivity for the incumbent devices in the shared spectrum. As another example, the inactivity condition may be related to a predetermined threshold of activity and/or interference. For instance, the inactivity condition may occur when a level of interference to an incumbent is below the threshold. As another example, the inactivity condition may be limited to a geographic area. For instance, the geographic area may include a zone, such as an Exclusion, Restriction, Protection zone or other zone At operation 910, the Private SAS controller 725 may send, to the group of eNBs 730, a first configuration message that may indicate information related to usage of the shared spectrum. In some cases, the message may indicate a first allocation of the channels to the group of eNBs 730. For instance, each eNB 730 in the group may be allocated one or more channels for usage, and the message may indicate this information. In addition, transmit power levels for the group of eNBs 730 may be indicated by the message in some cases. The transmit power levels may include a common transmit power level for all eNBs 730, one or more transmit power levels for individual eNBs 730 and or sub-groups of eNBs 730, transmit power limits and/or other suitable information related to transmission power.

At operation 915, the Private SAS controller 725 may send, to one or more eNBs 730 in the group, a request for interference measurements for the first allocation. It should be noted that embodiments are not limited to interference measurements, however, as other system performance measurements may be requested and/or used in some cases. In some cases, the Private SAS controller 725 may receive such a request (or a similar request for information from the eNBs 730) from the Public SAS controller 720. The Private SAS controller 725 may forward that request to the eNBs 730, in some cases, although embodiments are not limited to forwarding of such specific requests from the Public SAS controller 720. For instance, the Private SAS controller 725 may request the interference measurements (or other system performance measurements) from the eNBs 730 using any suitable technique, and may do so based on or in response to reception of the request from the Public SAS controller 720. Embodiments are not limited to interference measurements, as information such as spectrum information, spectrum sensing information, channel sensing information or other information may be requested in addition to or instead of the interference measurements, in some embodiments. As an example, output power measurements at the eNBs 730 and/or UEs 735 may be used. As another example, received power measurements and/or signal quality measurements at the eNBs 730 and/or UEs 735 may be used.

At operation 920, the Private SAS controller 725 may receive, from at least a portion of the eNBs 730, interference measurements for the first allocation. It should be noted that such information may be exchanged between the eNBs 730 and the Private SAS controller 725 based on or in response to the request from the Private SAS controller 725 to the eNBs 730, but embodiments are not limited as such. For instance, the eNBs 730 may transmit the information according to a schedule.

At operation 925, the Private SAS controller 725 may determine, based on the received interference measurements, an aggregate interference level for the first allocation. At operation 930, the Private SAS controller 725 may send, to the Public SAS controller 720, the aggregate interference level for the first allocation. In some embodiments, the Private SAS controller 725 may also refrain from sending, to the Public SAS controller 720, the received interference measurements for the first allocation. That is, specific and/or individual interference measurements may not be sent in some cases.

As an example, the aggregate interference level may include a sum and/or average of the measurements. The aggregate interference level may represent and/or characterize an overall interference level in the system when the first allocation is used, in some cases. However, interference levels and other information for individual eNBs 730 and/or UEs 735 may be obfuscated and/or anonymized by the aggregate interference level. Accordingly, the Private SAS controller 725 may provide relevant information (the aggregate) to the Public SAS controller 720 for usage in interference management and/or compliance determination, but may also maintain a level of confidentiality in terms of the operation and/or network layout of the eNBs 730 and/or UEs 735 (individual interference measurements). In some cases, values for some or all of the individual devices (eNBs 730 and/or UEs 735) may be excluded from the information provided to the Public SAS controller 720.

It should be noted that embodiments are not limited to the usage of the aggregate interference level in the information sent from the Private SAS controller 725 to the Public SAS controller 720. In some embodiments, other statistical measurements, such as histograms or other, may be determined based at least partly on the received interference measurements.

At operation 935, the Private SAS controller 725 may receive, from the Public SAS controller 720, a request for a re-allocation of the channels to the group of eNBs 730 and/or a modification to the transmit power levels for the eNBs 730. As an example, the Public SAS controller 720 may determine that the aggregate interference level is too high (for instance, in comparison to an interference level allowance and/or other threshold), and may request that the channels be re-allocated and/or that one or more transmit power levels be lowered. As another example, the Private SAS controller 725 may make such a determination based on an interference threshold (which may be a limit, maximum and/or other value) received from the Public SAS controller 720. For instance, a comparison between the interference threshold and the aggregate interference level (or other function of the interference measurements) may be performed by the Private SAS controller 725.

In some embodiments, the interference threshold may be or may be based on an interference level allowance. For instance, the interference level allowance may be related to a maximum permitted interference level. As an example, the interference level may be related to an aggregate interference level. As another example, the level may be related to individual interference levels from individual devices. These examples are not limiting, however, as any suitable interference level may be used.

At operation 940, the Private SAS controller 725 may send a second configuration message that indicates a second allocation of the channels to the group of eNBs 730 and/or a second set of transmit power levels for the group of eNBs 730. The second allocation and/or second set of transmit power levels may be determined to reduce, mitigate and/or manage overall system interference, in some cases. For instance, the determination may be performed based when the aggregate interference level is determined to be too high (for instance, in comparison to an interference level allowance and/or other threshold). In some embodiments, the second allocation of the channels may be part of a reassignment of the shared spectrum.

It should be noted that the second configuration message may include any information related to usage of the spectrum by the eNB 730. As an example, a spectrum usage indicator may indicate whether the eNB 730 is to refrain from usage of the first channel and/or whether the eNB 730 is permitted to use the first channel. The spectrum usage indicator may also indicate conditions under which the eNB 730 may use the first channel (or other spectrum). The conditions may be related to factors such as transmit power limits, output power limits, usage in one or more geographic areas and/or sub-areas, a sub-set of possible transmission sectors and/or other factors.

In some embodiments, the Private SAS controller 725 may decide which channels are to be allocated to individual eNBs 730 as part of the first and/or second allocations. In some embodiments, the Private SAS controller 725 may determine transmit power levels to be used by the eNBs 730 when communicating according to the first and/or second allocations, and may notify the eNBs 730 of this information. For instance, a second configuration message (or multiple such messages) may be used. In some cases, the second allocation may be a re-allocation of the channels for the eNBs 730. That is, for at least one eNB 730, channels allocated to the eNB 730 as part of the first allocation may be different than channels allocated to the eNB 730 as part of the second allocation. In addition, transmit power levels for the eNBs 730 may be different for the first and/or second allocations, in some cases. Accordingly, the second allocation may be part of a reassignment of the shared spectrum.

At operation 945, the Private SAS controller 725 may receive, from the Public SAS controller 720, an indication that one or more eNBs 730 in the group are to refrain from usage of the shared spectrum. At operation 950, the Private SAS controller 725 may send, to the group of eNBs 730, the indication that the eNBs 730 are to refrain from usage of the shared spectrum. It should be noted that embodiments are not limited to forwarding, to the eNBs 730, of the exact indication received from the Public SAS controller 720. In some embodiments, the Private SAS controller 725 may notify at least the affected eNBs 730 to refrain from usage of the shared spectrum in any suitable manner.

In some embodiments, the Private SAS controller 725 may be notified, by the Public SAS controller 720, of an unavailability of the shared spectrum. The Public SAS controller 720 may indicate the unavailability to the eNBs 730 and may indicate that the eNBs 730 are to vacate the shared spectrum. As an example, the unavailability may be based at least partly on activity of one or more incumbent devices. As another example, the unavailability may be based at least partly on an intention of the incumbent device(s) to retake the shared spectrum for primary usage. As another example, the unavailability may be based at least partly on a resumption of spectrum activity for the incumbent devices in the shared spectrum. As another example, the unavailability may be based at least partly on one or more scheduled periods of activity for the incumbent devices in the shared spectrum.

Figure 10:
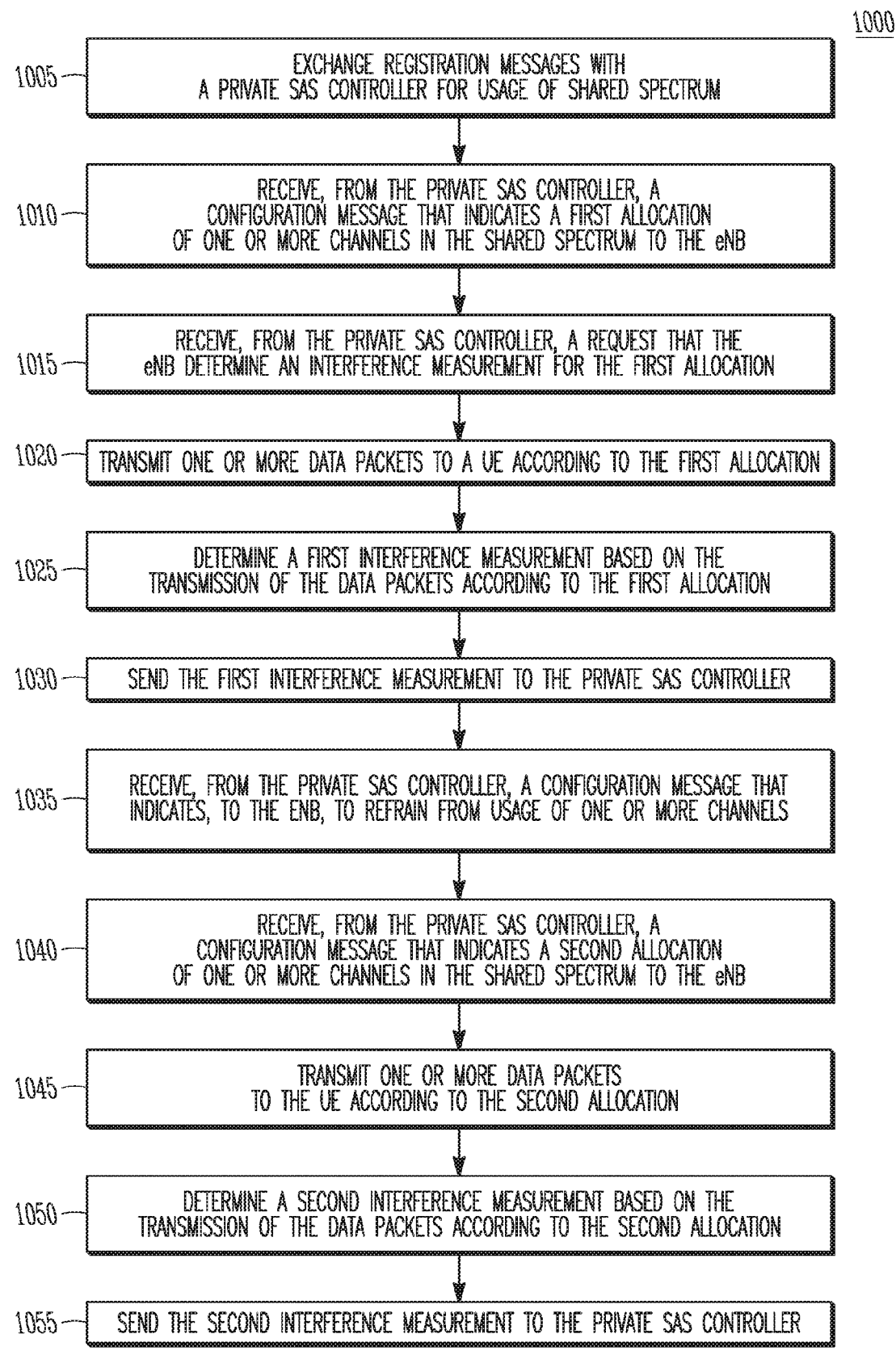
FIG. 10 illustrates the operation of another method of communication in shared spectrum in accordance with some embodiments.

FIG. 10 illustrates the operation of another method of allocation of shared spectrum in accordance with some embodiments. As mentioned previously regarding the method 900, embodiments of the method 1000 may include additional or even fewer operations or processes in comparison to what is illustrated in FIG. 10 and embodiments of the method 1000 are not necessarily limited to the chronological order that is shown in FIG. 10. In describing the method 1000, reference may be made to FIGS. 1-9 and 11-14, although it is understood that the method 1000 may be practiced with any other suitable systems, interfaces and components. In addition, embodiments of the method 1000 may refer to eNBs 104, UEs 102, APs, STAs, CBSDs, Private SAS controllers, Public SAS controllers or other wireless or mobile devices, although embodiments are not limited to those devices. Although the method 1000 may be described for an eNB 730, it is understood that other base station components and/or CBSDs may be used in some embodiments. The method 900 may also refer to an apparatus for an eNB 730, UE 735, Private SAS controller 725, Public SAS controller 720 and/or other device described above.

It should be noted that the method 1000 may be practiced at an eNB 730, and may include exchanging of signals or messages with a Private SAS controller 725. Similarly, the method 900 may be practiced at a Private SAS controller 725, and may include exchanging of signals or messages with an eNB 730. In some cases, operations and techniques described as part of the method 900 may be relevant to the method 1000. In addition, embodiments may include operations performed at the Private SAS controller 725 that are reciprocal or similar to other operations described herein performed at the eNB 730. For instance, an operation of the method 1000 may include reception of a message by the eNB 730 while an operation of the method 900 may include transmission of the same message or similar message by the Private SAS controller 725.

In addition, previous discussion of various techniques and concepts may be applicable to the method 1000 in some cases, including the primary and secondary usage of the shared spectrum, allocation of the shared spectrum, retaking of the shared spectrum for primary usage, the Private SAS controller 725, the Public SAS controller 720, interference measurements, interference level allowances, interference thresholds, spectrum information, spectrum sensing information, availability and/or unavailability of the shared spectrum, reallocation and/or reassignment of shared spectrum, and others.

At operation 1005, the eNB 730 may exchange one or more registration messages with a Private SAS controller 725 for usage of shared spectrum. Accordingly, the eNB 730 may register with the Private SAS controller 725 for secondary usage of the shared spectrum. At operation 1010, the eNB 730 may receive one or more configuration messages from the Private SAS controller 725 that allocates one or more channels of the shared spectrum to the eNB 730 for the secondary usage. That is, a first allocation of one or more channels to the eNB 730 may be indicated. In some cases, one or more transmit power levels may also be indicated by the configuration messages.

At operation 1015, the eNB 730 may receive, from the Private SAS controller 725, a request that the eNB 730 determine one or more interference measurements for the first allocation. At operation 1020, the eNB 730 may transmit one or more data packets to a UE 735 according to the first allocation. At operation 1025, a first interference measurement may be determined based on the transmission of the data packets according to the first allocation. As previously described, the first interference measurement may be based on a measurement of output transmit power at the eNB 730 and/or UEs 735 communication with the eNB 730. At operation 1030, the eNB 730 may send the measurement to the Private SAS controller 725. It should also be noted that embodiments are not limited to interference measurements, however, as other system performance measurements may be requested and/or used in some cases. Information such as spectrum information, spectrum sensing information, channel sensing information or other information may be requested in addition to or instead of the interference measurements, in some embodiments. As an example, output power measurements at the eNBs 730 and/or UEs 735 may be used. As another example, received power measurements and/or signal quality measurements at the eNBs 730 and/or UEs 735 may be used.

At operation 1035, the eNB 730 may receive, from the Private SAS controller 725, an indication that the eNB 730 is to refrain from usage of one or more channels, which may be included in the first allocation. The eNB 730 may refrain from usage of the indicated channels in response to the reception of the indication. It should be noted that the eNB 730 may receive, from the Private SAS controller 725, any information related to usage of the channels and/or spectrum by the eNB 730. As an example, a spectrum usage indicator may indicate whether the eNB 730 is to refrain from usage of one or more channels and/or whether the eNB 730 is permitted to use one or more channels. The spectrum usage indicator may also indicate conditions under which the eNB 730 may use the one or more channels (or other spectrum). The conditions may be related to factors such as transmit power limits, output power limits, usage in one or more geographic areas and/or sub-areas, a sub-set of possible transmission sectors and/or other factors At operation 1040, the eNB 730 may receive, from the Private SAS controller 725, one or more configuration messages that indicate a second allocation of one or more channels in the shared spectrum to the eNB 730. In some cases, the second allocation may be determined by the Private SAS controller 725, Public SAS controller 720 and/or other component in order to reduce interference.

As a non-limiting example, the first allocation may include a first channel and exclude a second channel, while the second allocation may include the second channel and exclude the first channel. Accordingly, it may be determined (based on one or more interference measurements for the first channel) that usage of the first channel causes too much interference, and the Private SAS controller 725 may notify the eNB 730 to switch to the second channel.

At operation 1045, the eNB 730 may transmit one or more data packets to the UE 735 according to the second allocation. The eNB 730 may also receive one or more uplink data packets according to the second allocation. At operation 1050, the eNB 730 may determine one or more interference measurements for the second allocation, and may send such measurements to the Private SAS controller 725 at operation 1055. Although not limited as such, techniques used for similar operations for the first allocation may be used in some cases.

Figure 11:
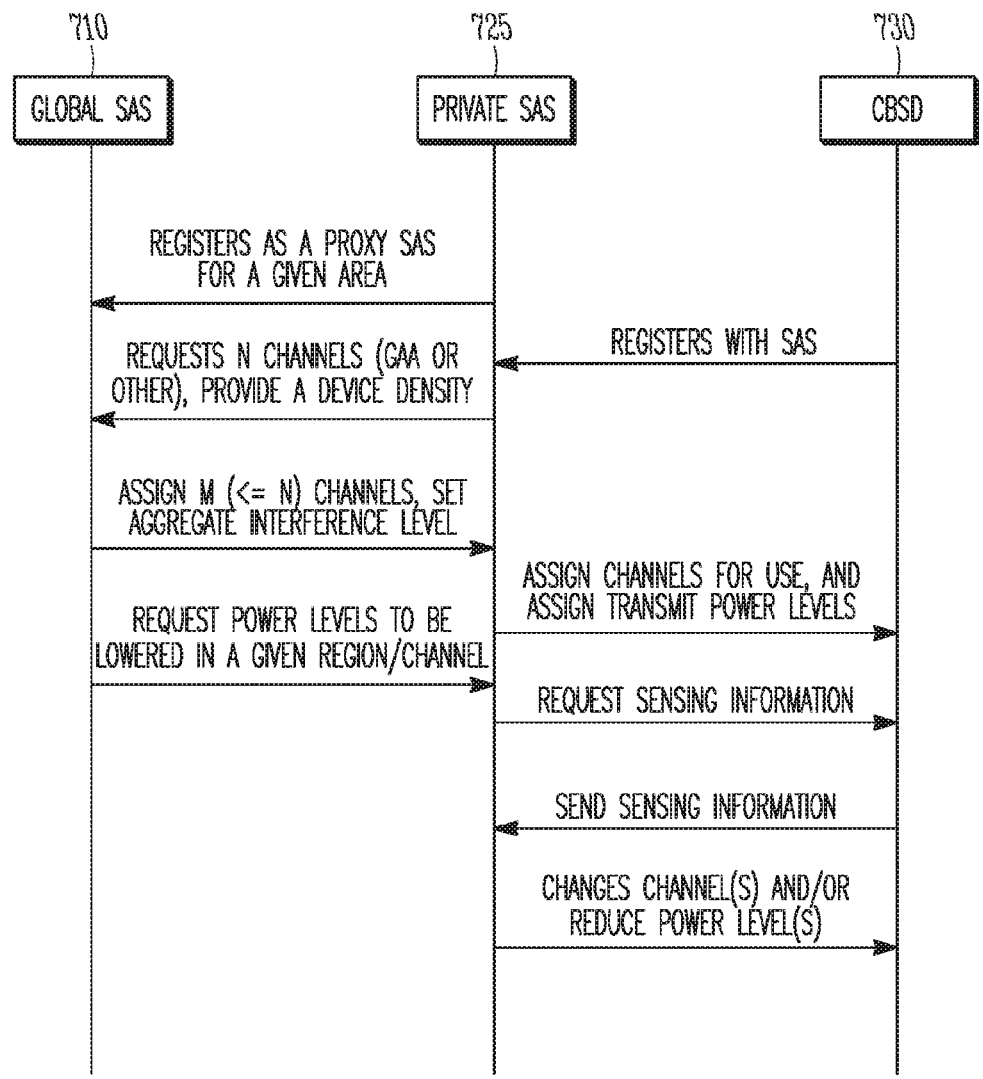
FIG. 11 illustrates a signal flow diagram for an example of communication in shared spectrum in accordance with some embodiments.

FIG. 11 illustrates a signal flow diagram for an example of communication in shared spectrum in accordance with some embodiments. It should be noted that embodiments are not limited to the operations shown in the example scenario 1100. Some embodiments may include fewer operations than what is shown in the example scenario 1100 in FIG. 11 and some embodiments may include additional operations not shown in example scenario 1100 in FIG. 11. In addition, embodiments are not limited to the chronological ordering shown in the example scenario 1100 in FIG. 11. It should be noted that concepts and/or techniques described herein may be applicable to the example scenario 1100 in some cases.

Figure 12:
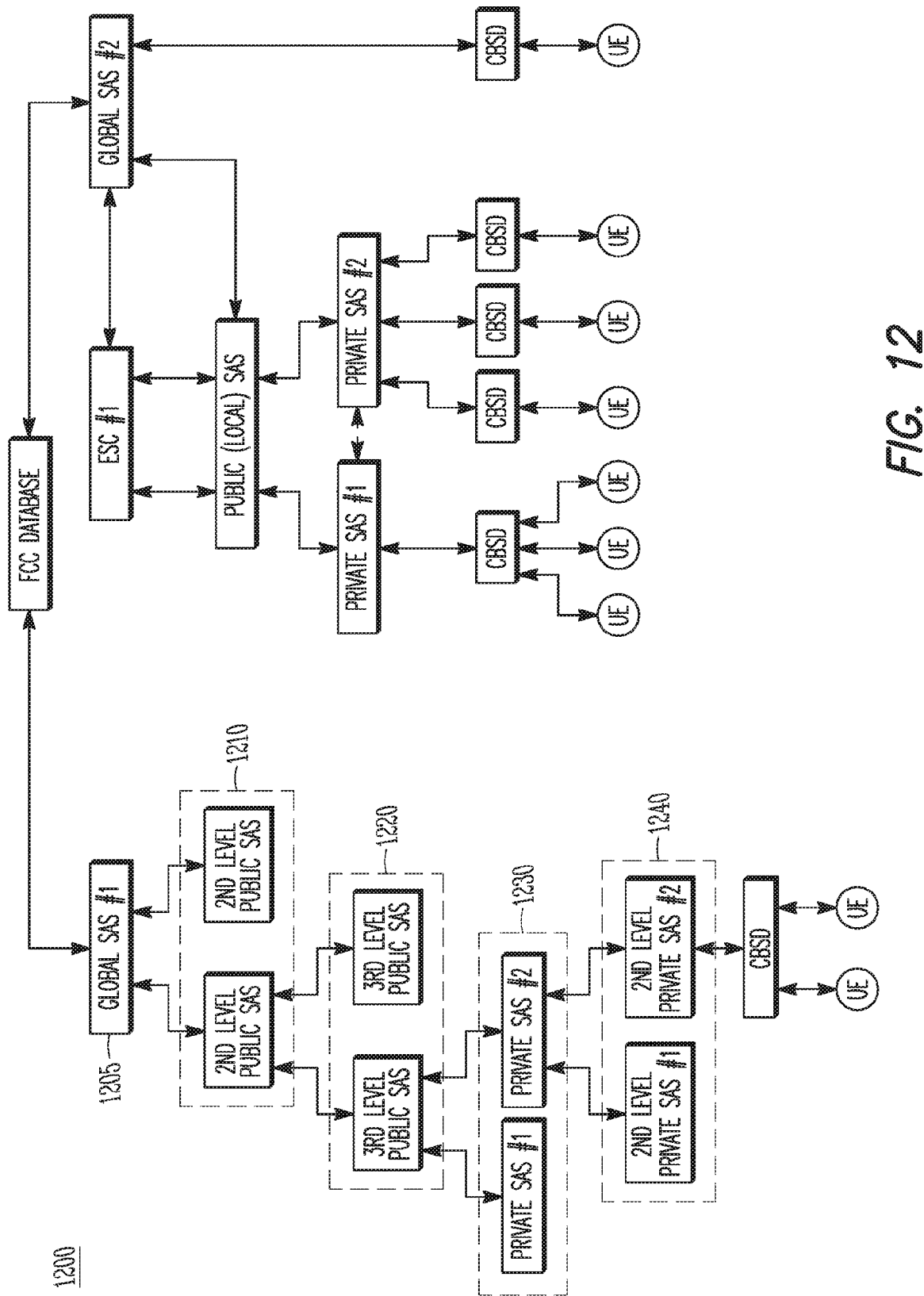
FIG. 12 illustrates another example network architecture that includes a SAS hierarchy in accordance with some embodiments.

FIG. 12 illustrates another example network architecture that includes a SAS hierarchy in accordance with some embodiments. As shown in the example network 1200 in FIG. 12, any number of Private SAS and/or Public SAS components and/or levels may be used in some embodiments, as part of a SAS hierarchy. As an example, a CBSD 730 may directly contact an allocated (typically lowest level) Private SAS component, which may process related information from one or more CBSDs 730. For instance, requests and/or triggers may be grouped together in function of the requested type of action. Such information may be forwarded to a next higher Private SAS component, and may be forwarded until reaching a highest level Private SAS component. The information may then be forwarded to a lowest level Public SAS component, and may be forwarded upwards until reaching a highest level Public SAS component, and then may be forwarded to the Global SAS component. Referring to FIG. 12, an example Public SAS hierarchy may include 1210 and 1220 and/or other levels. An example Private SAS hierarchy may include 1230 and 1240 and/or other levels.

Figure 13:
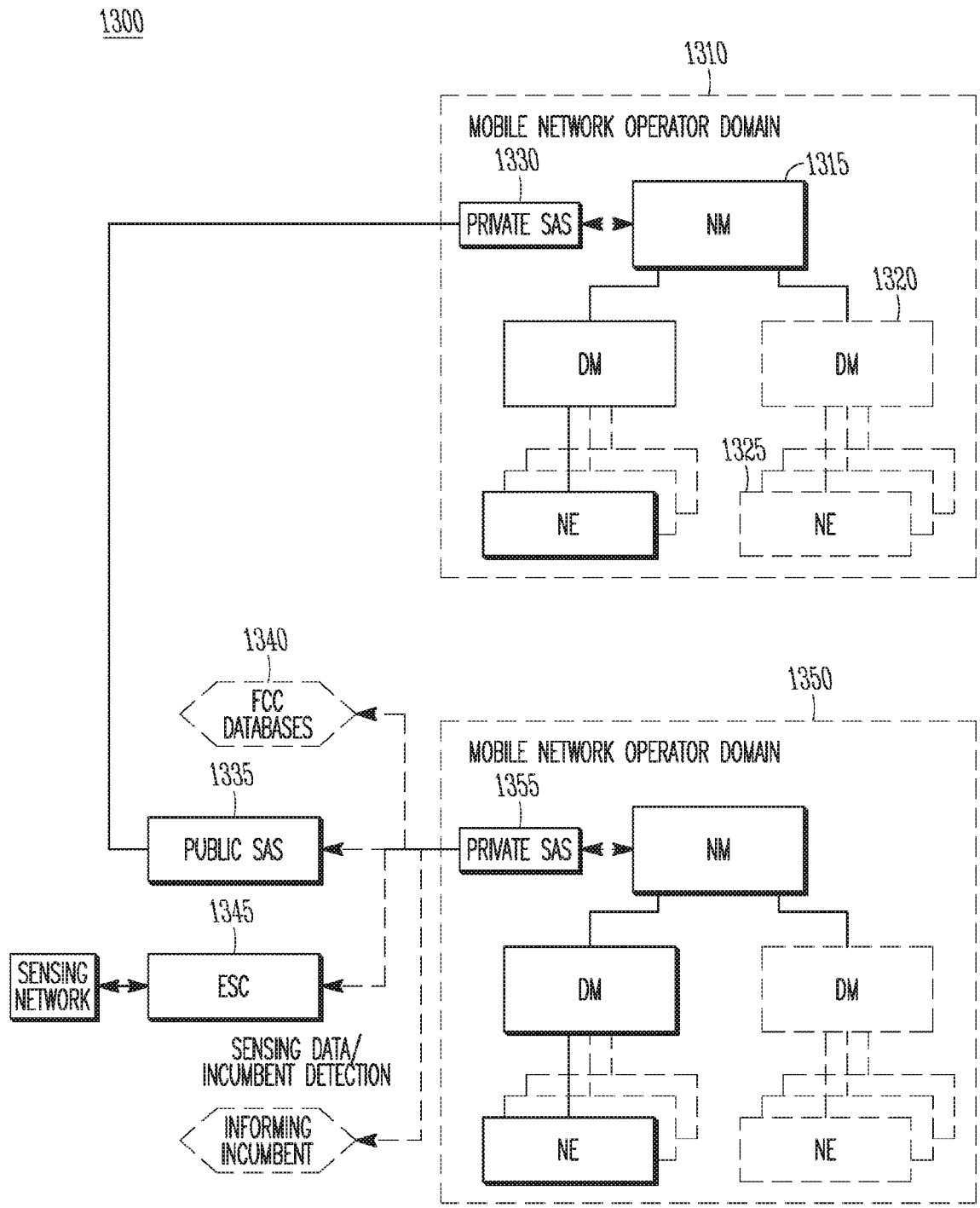
FIG. 13 illustrates another example network architecture that includes a SAS hierarchy in accordance with some embodiments.
Figure 14:
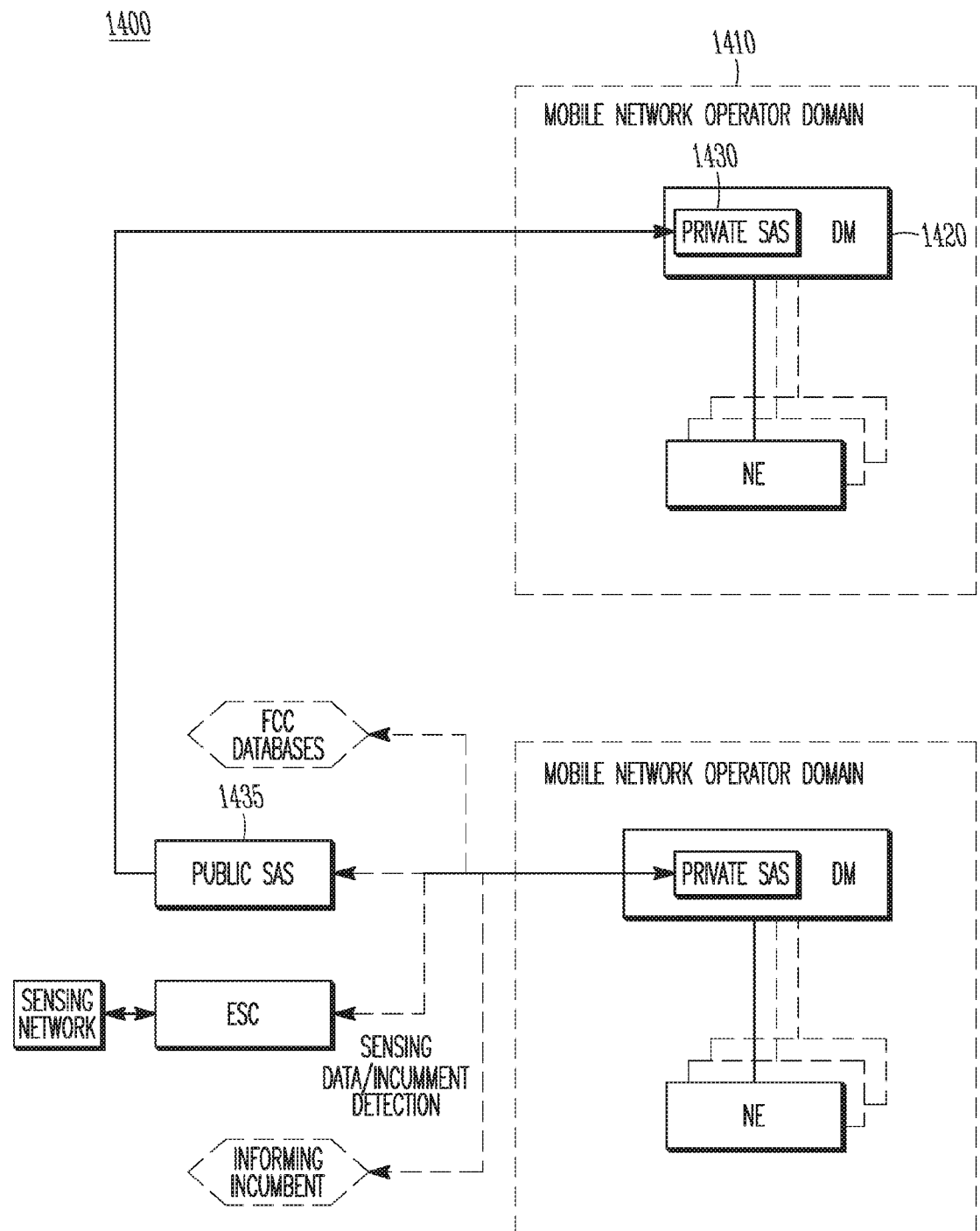
FIG. 14 illustrates another example network architecture that includes a SAS hierarchy in accordance with some embodiments.
Figure 15:
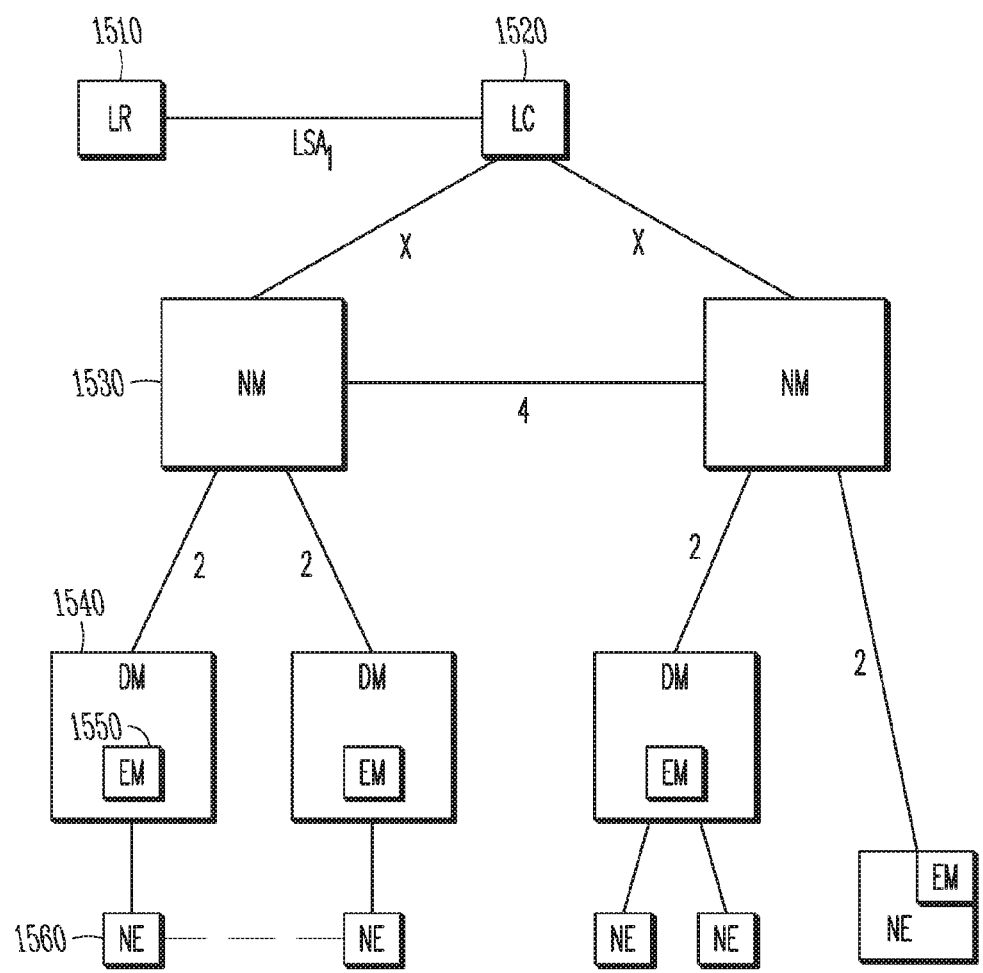
FIG. 15 illustrates another example network architecture that includes an LSA hierarchy in accordance with some embodiments.

FIG. 13 illustrates another example network architecture that includes a SAS hierarchy in accordance with some embodiments. FIG. 14 illustrates another example network architecture that includes a SAS hierarchy in accordance with some embodiments. FIG. 15 illustrates another example network architecture that includes an LSA hierarchy in accordance with some embodiments. It should be noted that embodiments are not limited to the example networks 1300, 1400, 1500 shown in FIGS. 13-15 in terms of number, type and/or arrangement of components.

As shown in the example networks 1300, 1400, a SAS hierarchy may include a Public SAS controller 1335 and a Private SAS controller 1330 for allocation of shared spectrum for the Mobile Network Operator Domain (MNO) 1310. In this example, a second MNO 1350 also employs a SAS hierarchy with the Public SAS controller 1335 and a Private SAS controller 1355. The MNO 1310 may include various components for network management, such as one or more Network Managers (NM) 1315, Domain Managers (DM) 1320, Network Elements (NE) 1325 and/or others. FCC databases 1340, ESC 1345. FIG. 14 illustrates an example network 1400 in which the Private SAS controller 1430 operates as part of a SAS hierarchy with the Public SAS controller 1435. In this example 1400, the Private SAS controller 1430 is included as part of the DM 1420, which is included in the MNO 1410.

As shown in FIG. 15, LSA components, such as the LSA Controller (LC) 1520 and the LSA Repository (LR) 1510 and/or others, may be integrated into a 3GPP SA5 system architecture. In addition, functionality for the LC 1520 may be split in a similar manner as described herein for SAS systems. LSA and SAS entities may also be integrated into other system architectures in some embodiments.

In some embodiments, within the multi-stakeholder (closed) (sub-)network and/or the (private) operators' network, the (Private) SAS controller may typically be connected to or included in one of the following entities which are defined by 3GPP System Architecture Group 5 (3GPP SA5). The Network Manager (NM) may provide a package of end-user functions with the responsibility for the management of a network, mainly as supported by the EM(s) but it may also involve direct access to the Network Elements (NE). All communication with the network may be based on open and well-standardized interfaces supporting management of multi-vendor and multi-technology Network Elements. The Domain Manager (DM) may provide element management functions and domain management functions for a sub-network. Inter-working domain managers may provide multi-vendor and multi-technology network management functions. An Element Manager (EM) may provide a package of end-user functions for management of a set of closely related types of network elements. These functions can be divided into two main categories: Element Management Functions and Sub-Network Management Functions. A Network Element (NE) may correspond to a discrete telecommunications entity, which can be managed over a specific interface, e.g. the RNC.

In Example 1, an apparatus for an Evolved Node-B (eNB) may comprise interface circuitry and hardware processing circuitry. The hardware processing circuitry may configure the interface circuitry to receive, from a Private Spectrum Access System (SAS) controller, a first configuration message that allocates, to the eNB, a first channel included in shared spectrum reserved for primary usage by an incumbent device. The hardware processing circuitry may further configure the interface circuitry to receive, from the Private SAS controller, a request that the eNB determine a system performance measurement. The hardware processing circuitry may further configure the interface circuitry to send, to the Private SAS controller, a system performance measurement based on a communication between the eNB and a User Equipment (UE). The hardware processing circuitry may further configure the interface circuitry to receive, from the Private SAS controller, a second configuration message that includes a spectrum usage indicator for usage of the first channel by the eNB.

In Example 2, the subject matter of Example 1, wherein the spectrum usage indicator may indicate either that the eNB is to refrain from usage of the first channel or that the eNB is permitted to use the first channel.

In Example 3, the subject matter of one or any combination of Examples 1-2, wherein the first configuration message may indicate a first transmit power to be used, by the eNB, for transmissions on the first channel. When the spectrum usage indicator indicates that the eNB is to refrain from usage of the first channel, the second configuration message may allocate, to the eNB, a second channel included in the shared spectrum and may further indicate a second transmit power to be used, by the eNB, for transmissions on the second channel.

In Example 4, the subject matter of one or any combination of Examples 1-3, wherein when the spectrum usage indicator indicates that the eNB is permitted to use the first channel, the second configuration message may further include a transmission power limit for the usage of the first channel and/or a geographic area in which the usage of the first channel is permitted.

In Example 5, the subject matter of one or any combination of Examples 1-4, wherein the system performance measurement may include an interference measurement based on an output transmit power used for a transmission of a data packet, by the eNB, to the UE.

In Example 6, the subject matter of one or any combination of Examples 1-5, wherein the apparatus may further comprise transceiver circuitry. The hardware processing circuitry may configure the transceiver circuitry to transmit the data packet to the UE.

In Example 7, the subject matter of one or any combination of Examples 1-6, wherein the data packet may be a first data packet. The hardware processing circuitry may further configure the transceiver circuitry to transmit a second data packet to the UE in the second channel. The hardware processing circuitry may further configure the interface circuitry to send, to the Private SAS controller, an interference measurement based on a transmit power used for the transmission of the second data packet.

In Example 8, the subject matter of one or any combination of Examples 1-7, wherein the eNB may be configured to operate as part of a mobile network operator (MNO) domain that includes the Private SAS controller.

In Example 9, an apparatus of a Private Spectrum Access System (SAS) controller may comprise interface circuitry and hardware processing circuitry. The hardware processing circuitry may configure the interface circuitry to receive, from a Public SAS controller, an indicator of channels that are available for secondary usage by a group of Evolved Node-Bs (eNBs). The channels may be included in shared spectrum reserved for primary usage by an incumbent device. The hardware processing circuitry may further configure the interface circuitry to send a first configuration message that indicates a first allocation of the channels to the eNBs for communication with User Equipments (UEs). The hardware processing circuitry may further configure the interface circuitry to receive, from the eNBs, interference measurements for the first allocation. The hardware processing circuitry may further configure the interface circuitry to send a second configuration message that indicates a second allocation of the channels to the eNBs for the communication with the UEs, the second allocation based at least partly on the interference measurements and an interference threshold determined by the Public SAS controller.

In Example 10, the subject matter of Example 9, wherein the apparatus may be configured to operate as part of the Private SAS controller for operation with the Public SAS controller as part of an SAS hierarchy to manage the primary usage and the secondary usage of the shared spectrum.

In Example 11, the subject matter of one or any combination of Examples 9-10, wherein the first configuration message may further indicate a first set of transmit power levels to be used by the eNBs for the communication with the UEs according to the first allocation of the channels.

In Example 12, the subject matter of one or any combination of Examples 9-11, wherein the second configuration message may further indicate a second, different set of transmit power levels to be used by the eNBs for the communication with the UEs according to the second allocation of the channels. The second set of transmit power levels may be based at least partly on the interference measurements and the interference threshold.

In Example 13, the subject matter of one or any combination of Examples 9-12, wherein the interference measurements may include one or more output power measurements at the eNBs and/or UEs. The hardware processing circuitry may be configured to determine an aggregate interference level based on the output power measurements.

In Example 14, the subject matter of one or any combination of Examples 9-13, wherein the hardware processing circuitry may configure the interface circuitry to send the aggregate interference level to the Public SAS controller. The hardware processing circuitry may further configure the interface circuitry to refrain from sending the output power measurements to the Public SAS controller.

In Example 15, the subject matter of one or any combination of Examples 9-14, wherein the second allocation may be determined, by the Private SAS controller, in response to a reception, from the Public SAS controller, of an indicator that the aggregate interference level exceeds the interference threshold.

In Example 16, the subject matter of one or any combination of Examples 9-15, wherein the refraining from sending the output power measurements to the Public SAS controller may be to enable an obfuscation of the interference measurements from the Public SAS controller.

In Example 17, the subject matter of one or any combination of Examples 9-16, wherein the hardware processing circuitry may be configured to determine the first allocation and the second allocation.

In Example 18, the subject matter of one or any combination of Examples 9-17, wherein for at least one of the eNBs, a first portion of the channels may be allocated to the eNB as part of the first allocation and a second, different portion of the channels may be allocated to the eNB as part of the second allocation.

In Example 19, the subject matter of one or any combination of Examples 9-18, wherein the second allocation of the channels may be performed to enable a reduction in interference for the communication between the eNBs and the UEs.

In Example 20, the subject matter of one or any combination of Examples 9-19, wherein the hardware processing circuitry may configure the interface circuitry to receive the interference threshold from the Public SAS controller. The hardware processing circuitry may further configure the interface circuitry to determine the second allocation of the channels based at least partly on a comparison between the interference measurements and the interference threshold.

In Example 21, the subject matter of one or any combination of Examples 9-20, wherein the hardware processing circuitry may further configure the interface circuitry to receive, from the Public SAS controller, an unavailability indicator for the shared spectrum for the secondary usage. The hardware processing circuitry may further configure the interface circuitry to send, to the eNBs, a spectrum vacate message that indicates that the eNBs are to refrain from usage of the channels for the communication with UEs.

In Example 22, the subject matter of one or any combination of Examples 9-21, wherein the spectrum vacate message may be sent in response to the reception of the unavailability indicator.

In Example 23, the subject matter of one or any combination of Examples 9-22, wherein the apparatus may be configured to operate as part of the Private SAS controller for operation as part of a mobile network operator (MNO) domain that excludes the Public SAS controller.

In Example 24, a non-transitory computer-readable storage medium may store instructions for execution by one or more processors to perform operations for management of shared spectrum by a Private Spectrum Access System (SAS) controller. The operations may configure the one or more processors to configure the Private SAS controller to allocate, for secondary usage for communication by a group of Evolved Node-Bs (eNBs) with one or more User Equipments (UEs), a group of channels included in the shared spectrum. The operations may further configure the one or more processors to transmit a spectrum sensing request to the group of eNBs for interference measurements that include transmitted powers at the eNBs in the group of channels. The operations may further configure the one or more processors to transmit, to a Public SAS controller, an aggregate interference level based on the received interference measurements. The operations may further configure the one or more processors to refrain from transmission of the received interference measurements to the Public SAS controller.

In Example 25, the subject matter of Example 24, wherein the aggregate interference level may be transmitted to the Public SAS controller to enable a determination, by the Public SAS controller, of a compliance for the communication by the group of eNBs, the compliance based at least partly on one or more interference restrictions for the shared spectrum.

In Example 26, the subject matter of one or any combination of Examples 24-25, wherein the operations may further configure the one or more processors to configure the Private SAS controller to receive, from the Public SAS controller, a compliance indicator for the communication by the group of eNBs. The operations may further configure the one or more processors to configure the Private SAS controller to, when the compliance indicator indicates that the communication by the group of eNBs is not compliant, reallocate the group of channels for the secondary usage. The allocation of the group of channels may be based on a first mapping between the group of channels and the group of eNBs and the reallocation of the group of channels may be based on a second mapping between the group of channels and the group of eNBs.

In Example 27, the subject matter of one or any combination of Examples 24-26, wherein the shared spectrum may be reserved at least partly for primary usage by one or more incumbent devices. The operations may further configure the one or more processors to configure the Private SAS controller to receive, from the Public SAS controller, an indicator of an availability of the group of channels for the secondary usage. The availability may be based at least partly on an inactivity of the incumbent devices.

In Example 28, the subject matter of one or any combination of Examples 24-27, wherein the operations may be performed for the management of the shared spectrum by the Private SAS controller operating as part of an SAS hierarchy with the Public SAS controller.

In Example 29, the subject matter of one or any combination of Examples 24-28, wherein the refraining from transmission of the received interference measurements to the Public SAS controller may be to enable an obfuscation of the interference measurements from the Public SAS controller.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   at least one processor configured to cause a base station (BS), configured to operate in accordance with a Licensed Shared Access (LSA) arrangement, to:
   wherein for accessing a carrier within a shared spectrum on which secondary cell (Scell) transmissions are to be performed, the at least one processor is further configured to:
   decode from an LSA controller (LC) a LSA Spectrum Resource Availability Information message that indicates that the carrier is available for secondary usage, wherein the Spectrum Resource Availability Information message includes a validity time for availability of the carrier and geographic zone restriction for the carrier, and wherein primary usage of the carrier is prioritized for incumbent devices over secondary usage for Scell operation;
   configure the base station to perform an energy detection threshold adaptation procedure to set an energy detection threshold for the carrier to be less than or equal to a maximum energy detection threshold, wherein the maximum energy detection threshold is received in a configuration message from the LC;
   encode a message for transmission to the LC, wherein message includes an interference measurement for the carrier; and
   receive an authorization from the LC to access the carrier for Scell transmissions or a second LSA Spectrum Resource Availability Information message that indicates that a second carrier is available for secondary usage.

2. The apparatus of claim 1, wherein when the authorization to access the carrier for Scell transmissions is received from the LC, the at least one processor is further configured to:
   encode radio resource configuration signaling for transmission to a user equipment (UE) that include an allocation of the carrier and configuration information for the carrier.

3. The apparatus of claim 2, wherein the configuration information for the carrier comprises a transmission power limit, the validity time and the geographic zone restriction.

4. The apparatus of claim 3, wherein the at least one processor is further configured to decode a message from the LC to refrain from further usage of the carrier for Scell transmissions based on incumbent usage.

5. The apparatus of claim 2, wherein upon expiration of the validity time, the at least one processor is further configured to configure the base station to refrain from further usage of the carrier for Scell transmissions.

6. The apparatus of claim 1, wherein the base station is further configured for primary cell (Pcell) transmissions for incumbent usage within a licensed spectrum, wherein the at least one processor is further configured to:
   refrain from performing the energy detection threshold adaptation procedure for accessing a carrier within the licensed spectrum for the Pcell transmissions.

7. The apparatus of claim 1, wherein the at least one processor comprises a baseband processor.

8. The apparatus of claim 7, wherein the at least one processor is configured to store the LSA Spectrum Resource Availability Information message in a memory.

9. A non-transitory computer-readable storage medium storing program instructions executable by at least one processor of base station, configured to operate in accordance with a Licensed Shared Access (LSA) arrangement to:
  wherein for accessing a carrier within a shared spectrum on which secondary cell (Scell) transmissions are to be performed, the at least one processor is further configured to:
    decode from an LSA controller (LC) a LSA Spectrum Resource Availability Information message that indicates that the carrier is available for secondary usage, wherein the Spectrum Resource Availability Information message includes a validity time for availability of the carrier and geographic zone restriction for the carrier, and wherein primary usage of the carrier is prioritized for incumbent devices over secondary usage for Scell operation;
    configure the base station to perform an energy detection threshold adaptation procedure to set an energy detection threshold for the carrier to be less than or equal to a maximum energy detection threshold, wherein the maximum energy detection threshold is received in a configuration message from the LC;
    encode a message for transmission to the LC, wherein the message includes an interference measurement for the carrier; and
    receive an authorization from the LC to access the carrier for Scell transmissions or a second LSA Spectrum Resource Availability Information message that indicates that a second carrier is available for secondary usage.

10. The non-transitory computer-readable storage medium of claim 9, wherein when the authorization to access the carrier for Scell transmissions is received from the LC, the at least one processor is further configured to:
  encode radio resource configuration signaling for transmission to a user equipment (UE) that include an allocation of the carrier and configuration information for the carrier.

11. The non-transitory computer-readable storage medium of claim 10, wherein the configuration information for the carrier comprises a transmission power limit, the validity time and the geographic zone restriction.

12. The non-transitory computer-readable storage medium of claim 11, wherein the at least one processor is further configured to decode a message from the LC to refrain from further usage of the carrier for Scell transmissions based on incumbent usage.

13. The non-transitory computer-readable storage medium of claim 10, wherein upon expiration of the validity time, the at least one processor is further configured to configure the base station to refrain from further usage of the carrier for Scell transmissions.

14. The non-transitory computer-readable storage medium of claim 9, wherein the base station is configured for primary cell (Pcell) transmissions for incumbent usage within a licensed spectrum, wherein the at least one processor is further configured to:
  refrain from performing the energy detection threshold adaptation procedure for accessing a carrier within the licensed spectrum for the Pcell transmissions.

15. A method of operating a base station configured to operate in accordance with a Licensed Shared Access (LSA) arrangement comprising:
  wherein for accessing a carrier within a shared spectrum on which secondary cell (Scell) transmissions are to be performed, the base station is configured to:
    decode from an LSA controller (LC) a LSA Spectrum Resource Availability Information message that indicates that the carrier is available for secondary usage, wherein the Spectrum Resource Availability Information message includes a validity time for availability of the carrier and geographic zone restriction for the carrier, and wherein primary usage of the carrier is prioritized for incumbent devices over secondary usage for Scell operation;
    configure the base station to perform an energy detection threshold adaptation procedure to set an energy detection threshold for the carrier to be less than or equal to a maximum energy detection threshold, wherein the maximum energy detection threshold is received in a configuration message from the LC;
    encode a message for transmission to the LC, wherein the message includes an interference measurement for the carrier; and
    receive an authorization from the LC to access the carrier for Scell transmissions or a second LSA Spectrum Resource Availability Information message that indicates that a second carrier is available for secondary usage.

16. The method of claim 15, wherein when the authorization to access the carrier for Scell transmissions is received from the LC, the base station is further configured to:
  encode radio resource configuration signaling for transmission to a user equipment (UE) that include an allocation of the carrier and configuration information for the carrier.

17. The method of claim 16, wherein the configuration information for the carrier comprises a transmission power limit, the validity time and the geographic zone restriction.

18. The method of claim 17, wherein the base station is further configured to decode a message from the LC to refrain from further usage of the carrier for Scell transmissions based on incumbent usage.

19. The method of claim 16, wherein upon expiration of the validity time, the base station is further configured to refrain from further usage of the carrier for Scell transmissions.

20. The method of claim 15, wherein the base station is configured for primary cell (Pcell) transmissions for incumbent usage within a licensed spectrum, and wherein the base station is further configured to:
  refrain from performing the energy detection threshold adaptation procedure for accessing a carrier within the licensed spectrum for the Pcell transmissions.

* * * * *